(12) United States Patent
Sakai et al.

(10) Patent No.: US 10,302,321 B2
(45) Date of Patent: May 28, 2019

(54) VENTILATION FAN AND VENTILATION SYSTEM

(71) Applicant: Panasonic Corporation, Osaka (JP)

(72) Inventors: Hirosato Sakai, Aichi (JP); Hidenori Syougen, Aichi (JP); Nobuyuki Morimoto, Aichi (JP); Tsuraki Nakajima, Aichi (JP); Shingo Takenawa, Aichi (JP); Masahiro Yamaguchi, Aichi (JP); Kazuki Doumoto, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 715 days.

(21) Appl. No.: 14/383,151

(22) PCT Filed: Mar. 8, 2013

(86) PCT No.: PCT/JP2013/001544
§ 371 (c)(1),
(2) Date: Sep. 5, 2014

(87) PCT Pub. No.: WO2013/132876
PCT Pub. Date: Sep. 12, 2013

(65) Prior Publication Data
US 2015/0050876 A1    Feb. 19, 2015

(30) Foreign Application Priority Data

Mar. 9, 2012  (JP) .................................. 2012-052681
Sep. 19, 2012 (JP) .................................. 2012-205280
(Continued)

(51) Int. Cl.
*F24F 7/007*    (2006.01)
*F24F 11/00*    (2018.01)
(Continued)

(52) U.S. Cl.
CPC .......... *F24F 7/007* (2013.01); *F24F 11/0001* (2013.01); *F24F 11/30* (2018.01);
(Continued)

(58) Field of Classification Search
CPC .. F24F 11/0001; F24F 11/001; F24F 11/0012; F24F 11/0015; F24F 11/0034;
(Continued)

(56) References Cited

U.S. PATENT DOCUMENTS 4,681,024 A * 7/1987 Ivey ...................... F24H 3/0411
                                                  219/220
4,730,551 A * 3/1988 Peludat ................. F24F 3/1603
                                                  454/233
(Continued)

FOREIGN PATENT DOCUMENTS

| CN | 101737893 | 6/2010 |
|---|---|---|
| CN | 101975433 | 2/2011 |

(Continued)

OTHER PUBLICATIONS

JP 2007-333363 English translation.*
(Continued)

*Primary Examiner* — Steven B McAllister
*Assistant Examiner* — Samantha A Miller
(74) *Attorney, Agent, or Firm* — RatnerPrestia

(57) ABSTRACT

A ventilation fan includes a body unit, which has a fan disposed in a body case and a fan controller operable to control an air volume of the fan. The ventilation fan also includes a sensor module having an indoor environment detecting sensor and a module controller operable to control a detecting operation of the indoor environment detecting sensor. The body unit has a module mount on which the sensor module is mounted and another sensor module can be mounted in place of the sensor module. The module mount (Continued)

is connected to the fan controller. The module controller outputs detection information obtained based on a detection result of the indoor environment detecting sensor to the fan controller, which in turn controls the air volume of the fan based on the detection information inputted thereto.

9 Claims, 26 Drawing Sheets

(30) Foreign Application Priority Data

Sep. 26, 2012 (JP) .................................. 2012-211828
Nov. 29, 2012 (JP) .................................. 2012-260667

(51) Int. Cl.
*F24F 11/30* (2018.01)
*F24F 11/77* (2018.01)
*F24F 110/10* (2018.01)
*F24F 110/20* (2018.01)
*F24F 110/70* (2018.01)
*F24F 110/72* (2018.01)
*F24F 120/10* (2018.01)
*F24F 130/30* (2018.01)

(52) U.S. Cl.
CPC ........... *F24F 11/77* (2018.01); *F24F 2110/10* (2018.01); *F24F 2110/20* (2018.01); *F24F 2110/70* (2018.01); *F24F 2110/72* (2018.01); *F24F 2120/10* (2018.01); *F24F 2130/30* (2018.01)

(58) Field of Classification Search
CPC ........... F24F 11/0079; F24F 2011/0026; F24F 2011/0027; F24F 2011/005; F24F 7/007; F24F 11/00; Y02B 30/746; Y02B 30/78
USPC ......................................................... 454/256
See application file for complete search history.

(56) References Cited

U.S. PATENT DOCUMENTS

| | | | |
|---|---|---|---|
| 5,934,362 A * | 8/1999 | Barker, II | F24F 7/06 165/237 |
| 7,473,074 B2 * | 1/2009 | Herbst | F04D 29/023 415/116 |
| 9,194,603 B2 * | 11/2015 | Yuan | F04D 25/14 |
| 9,416,989 B1 * | 8/2016 | Tom | F24F 13/078 |
| 9,553,451 B2 * | 1/2017 | Zacharchuk | H04L 12/2816 |
| 9,746,197 B2 * | 8/2017 | Katsumi | F24F 11/0001 |
| 9,816,717 B1 * | 11/2017 | Lawrence | F24F 7/065 |
| 2005/0287945 A1 | 12/2005 | Choi et al. | |
| 2010/0024106 A1 * | 2/2010 | Katsumi | F24D 5/12 4/213 |
| 2010/0112929 A1 * | 5/2010 | Iantorno | F24F 7/065 454/275 |

FOREIGN PATENT DOCUMENTS

| | | |
|---|---|---|
| JP | 06026678 | 2/1994 |
| JP | 6-300341 A | 10/1994 |
| JP | 2000-146268 A | 5/2000 |
| JP | 2000146268 | 5/2000 |
| JP | 2000-274791 A | 10/2000 |
| JP | 2001-306155 A | 11/2001 |
| JP | 2006-38364 A | 2/2006 |
| JP | 2007-333363 A | 12/2007 |
| JP | 2010-117111 A | 5/2010 |
| JP | 2011-137595 A | 7/2011 |
| KR | 20060107243 | 10/2006 |

OTHER PUBLICATIONS

Japanese Decision of Rejection dated Mar. 29, 2016 for JP Application No. 2014-503507 (3 pages).
Chinese Office Action with partial English translation and Chinese Search Report with complete English translation for CN Application No. 201380013206.1 dated May 11, 2016 (13 pages).
JP Office Action for 2014-503507, dated Aug. 4, 2015.
International Preliminary Report on Patentability for international application No. PCT/JP2013/001544 dated Sep. 9, 2014.
International Search Report for PCT/JP2013/001544, dated Jun. 4, 2013.

* cited by examiner (a)

(b)

| ROOM LAYOUT SETTING (m2) | TOTAL VENTILATION AIR VOLUME (m3/h) |
|---|---|
| ~150 | 150 |
| 151~300 | 170 |
| 301~450 | 190 |
| 451~600 | 210 |
| 601~750 | 230 |
| 751~ | 250 |

VENTILATION FAN AND VENTILATION SYSTEM

This application is a U.S. National Phase Application of PCT International Application PCT/JP2013/001544.

TECHNICAL FIELD

The present invention relates to a ventilation fan installed on a ceiling.

BACKGROUND ART

A conventional ventilation fan of this kind includes a body case having an indoor air suction opening defined in a lower wall thereof and an indoor air discharge opening defined in a side wall or upper wall thereof, a fan mounted in the body case, and a controller for controlling the operation of the fan. Further, for example, a human body detecting sensor is mounted as a sensor for detecting an indoor environment and connected to the controller. If the presence of a human body is detected by the human body detecting sensor, the controller controls the fan to drive it or increase the air volume (see, for example, Patent Document 1 or 2).

PATENT DOCUMENTS

Patent Document 1: JP 6-300341 A
Patent Document 2: JP 2010-117111 A

SUMMARY OF THE INVENTION

However, as such a sensor for detecting the indoor environment, there are various sensors such as, for example, a temperature sensor, a humidity sensor, an illuminance sensor and the like in addition to the human body detecting sensor. There are also a great number of environments, in which a ventilation fan is installed, such as, for example, individual houses, individual offices and the like. For this reason, many kinds of ventilation fans are required depending on the kind of sensor to be installed thereon and installation environments, thus resulting in an increase in production cost, management cost or the like. Also, there are times when the kind of sensor must be changed after a ventilation fan has been installed. In this case, the whole ventilation fan must be replaced.

The present invention has been developed to solve the above-described conventional problems and is intended to provide a ventilation fan and a ventilation system capable of reducing the production cost or management cost.

A ventilation fan embodying the present invention includes a body unit that includes a body case having an indoor air suction opening and an indoor air discharge opening both defined therein, a fan disposed in the body case, and a fan controller operable to control an air volume of the fan. The ventilation fan also includes a sensor module having an indoor environment detecting sensor and a module controller operable to control a detecting operation of the indoor environment detecting sensor. The body unit also includes a module mount on which the sensor module is mounted and another sensor module can be mounted in place of the sensor module, the module mount being connected to the fan controller. The module controller outputs detection information obtained based on a detection result of the indoor environment detecting sensor to the fan controller, which in turn controls the air volume of the fan based on the detection information inputted thereto.

A ventilation system embodying the present invention holds a ventilation air volume constant in a building and includes at least two ventilation fans of the above-described configuration installed in the same building. Each ventilation fan includes an information transmitting portion operable to transmit its own air volume information determined based on detection information inputted from a sensor module mounted thereon to other ventilation fans, an information receiving portion operable to receive information from the other ventilation fans, and an air volume decision means operable to compare a total air volume of the air volume information of its own fan and the air volume information of the other ventilation fans received by the information receiving portion with a total ventilation air volume information in the building set in advance to determine the air volume of its own fan so as to maintain the total ventilation air volume.

EFFECTS OF THE INVENTION

The ventilation fan and the ventilation system according to the present invention can reduce the production cost or management cost.

EMBODIMENTS FOR CARRYING OUT THE INVENTION

Figure 1:
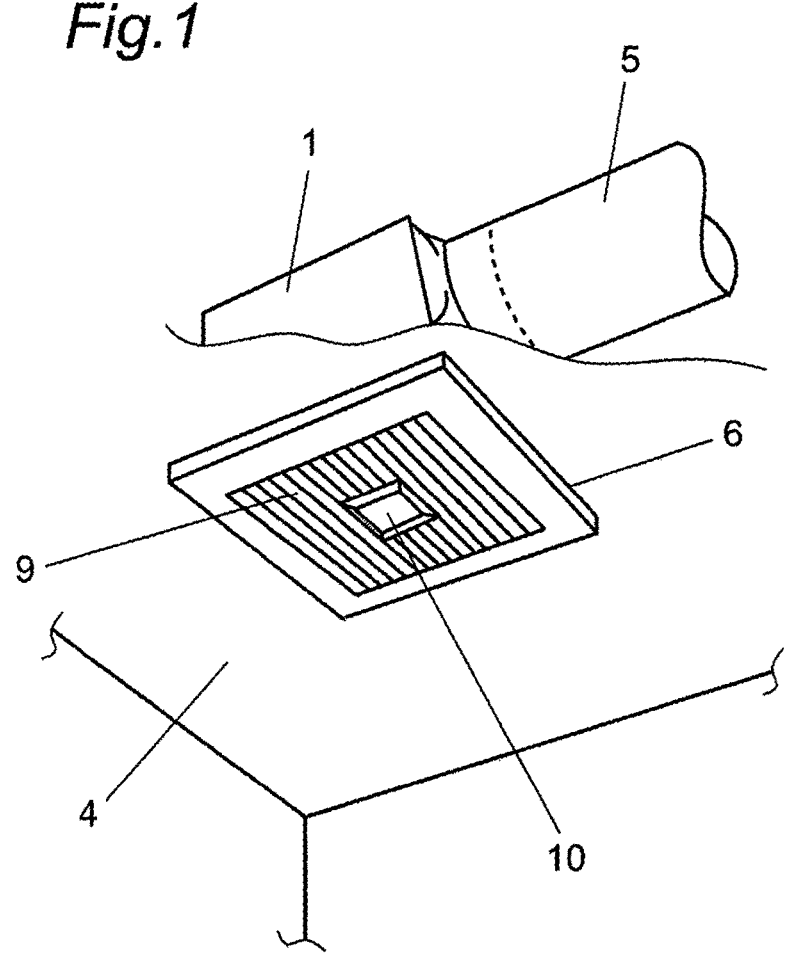
FIG. 1 is a partially cutaway perspective view of a ventilation fan according to a first embodiment of the present invention, showing an example of installation thereof.

A ventilation fan according to the first invention comprises: a body unit including; a body case having an indoor air suction opening and an indoor air discharge opening both defined therein; a fan disposed in the body case; and a fan controller operable to control an air volume of the fan; a sensor module including; an indoor environment detecting sensor; and a module controller operable to control a detecting operation of the indoor environment detecting sensor; wherein the body unit has a module mount on which the sensor module is mounted and another sensor module can be mounted in place of the sensor module, and the module mount is connected to the fan controller, and the module controller outputs detection information obtained based on a detection result of the indoor environment detecting sensor to the fan controller, which controls the air volume of the fan based on the detection information inputted thereto.

This configuration can separate the body unit and the sensor module from each other to allow the body unit to have a common specification. Also, a sensor module having an indoor environment detecting sensor required depending on an indoor environment can be mounted on the body unit so as to be replaced with another sensor module. Accordingly, in the ventilation fan equipped with the indoor environment detecting sensor, the production or management cost can be reduced.

In the ventilation fan according to the first invention, the second invention is characterized in that the module controller outputs identification information of the indoor environment detecting sensor to the fan controller, which controls the air volume of the fan based on the identification information and the detection information inputted thereto.

This configuration allows the fan controller to identify the kind of sensor module mounted on the body unit, thus making it possible to allow the fan controller to perform a fan control depending on the mounted sensor module.

In the ventilation fan according to the first or second invention, the third invention is characterized in that a plurality of sensor modules can be simultaneously mounted on the module mount and the fan controller has an arithmetic section to calculate the air volume of the fan based on different detection information inputted from the plurality of sensor modules using an algorism set in advance. This configuration allows the fan controller to realize a fan control based on the information inputted from the plurality of sensor modules. Also, a fan control associated with the features of the indoor environment detecting sensor can be realized, for example, by weighting the inputted information depending on the kind of sensor module.

In the ventilation fan according to any one of the first through third inventions, the fourth invention is characterized in that the module controller determines air volume information of the fan based on a kind or the detection result of the indoor environment detecting sensor and outputs the air volume information determined as the detection information to the fan controller. The module controller determines the air volume information of the fan and outputs it to the fan controller of the body unit, thereby making it possible to commonly and simply configure a fan controller specification for various kinds of indoor environment detecting sensors.

In the ventilation fan according to any one of the first through fourth inventions, the fifth invention is characterized in that a connecting portion of the sensor module to be connected to the module mount has a common shape with a connecting portion of another sensor module. By this configuration, the sensor module can be easily replaced with another sensor module.

In the ventilation fan according to any one of the first through fifth inventions, the sixth invention is characterized in that the sensor module comprises at least one of a human body detecting sensor, a temperature sensor, a humidity sensor, an illumination sensor, a carbon monoxide sensor and a carbon dioxide sensor as the indoor environment detecting sensor, thereby making it possible to provide a ventilation fan having a variety of functions.

A ventilation system according to the seventh invention operable to hold a ventilation air volume constant in a building comprises: at least two ventilation fans according to any one of the first through sixth inventions installed in the same building; and each ventilation fan comprising; an information transmitting portion operable to transmit its own air volume information determined based on detection information inputted from a sensor module mounted thereon to other ventilation fans; an information receiving portion operable to receive information from the other ventilation fans; and an air volume decision means operable to compare a total air volume of the air volume information of its own fan and the air volume information of the other ventilation fans received by the information receiving portion with a total ventilation air volume information in the building set in advance to determine the air volume of its own fan so as to maintain the total ventilation air volume. By this configuration, a ventilation system having a plurality of ventilation fans installed in the same building can optimally maintain a ventilation air volume required for the whole building and reduce an energy loss caused by an excess of ventilation air volume.

In the ventilation system according to the seventh invention, the eighth invention is characterized in that each ventilation fan comprises a communication module having the information transmitting portion and the information receiving portion and is mounted on the module mount. This configuration allows a combination of a sensor module and the communication module to be mounted on the body unit, thereby making it possible to provide a ventilation fan of a specification corresponding to an indoor environment while enabling communications with other ventilation fans.

Embodiments of the present invention are described hereinafter with reference to the drawings, but the present invention is not limited by the embodiments.

(Embodiment 1)

Figure 2:
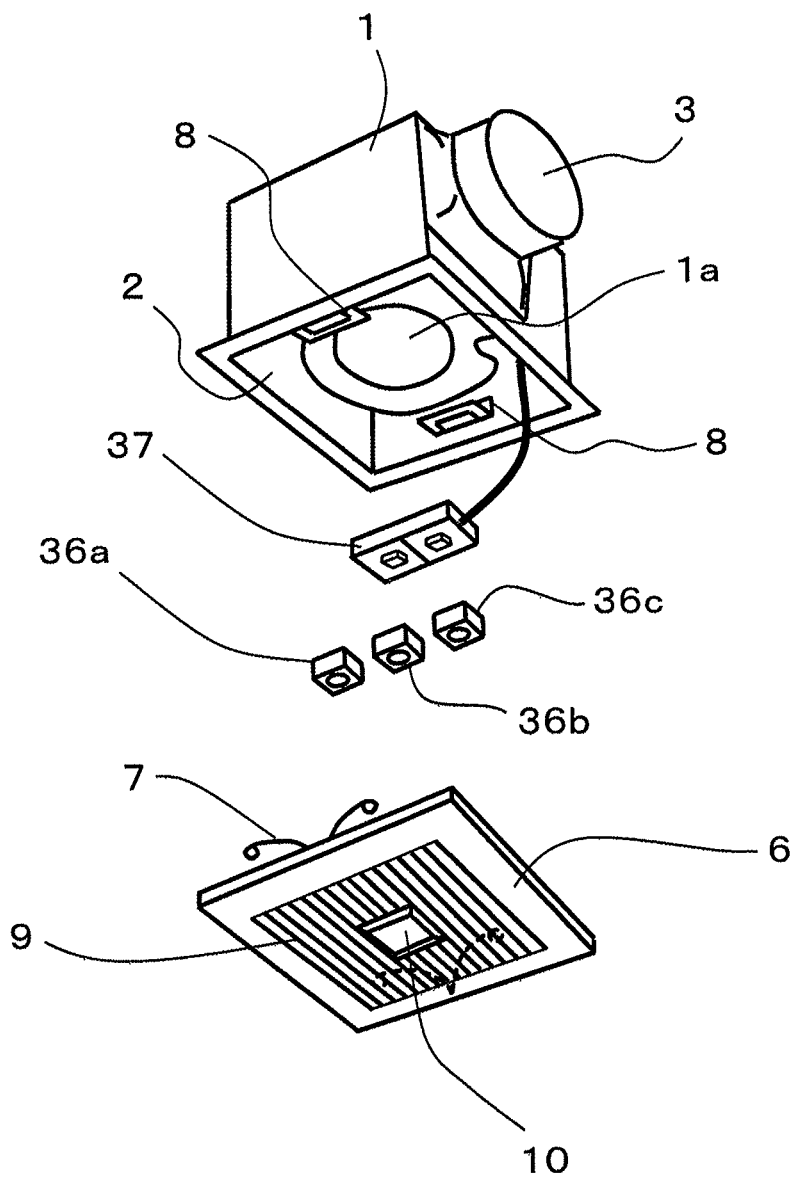
FIG. 2 is an exploded perspective view of the ventilation fan according to the first embodiment.

FIG. 1 is a partially cutaway perspective view of a ventilation fan according to a first embodiment of the present invention, showing an example of installation thereof, and FIG. 2 is an exploded perspective view of the ventilation fan.

As shown in FIG. 1 and FIG. 2, the ventilation fan 50 includes a body unit 51 having a box-shaped body case 1, and a fan 1a mounted in the body case 1. The body unit 51 is mounted on an upper surface of a ceiling board 4. The body case 1 has an indoor air suction opening 2 defined in a lower surface thereof and an indoor air discharge opening 3 defined in a side surface thereof (this opening may be formed in an upper surface).

As shown in FIG. 1, the body case 1 is mounted on the upper surface of the ceiling board 4, which has an opening (not shown) of a size nearly equal to that of the indoor air suction opening 2. The indoor air discharge opening 3 in the body case 1 is connected to one end of a duct 5, the other end of which is extended to outdoors.

A decorative board 6 is removably mounted so as to cover the indoor air suction opening 2 from a lower surface of the ceiling board 4. In mounting the decorative board 6 on the body case 1, a well-known structure is employed. By way of example, the decorative board 6 is mounted on the body case 1 by mounting attachment springs 7 to the decorative board 6 and subsequently engaging the attachment springs 7 with respective mounting portions 8 of the body case 1.

The decorative board 6 is formed so as to be greater than the indoor air suction opening 2 in the body case 1 to cover the opening (not shown) in the ceiling board 4 and the indoor air suction opening 2 from the lower surface side of the ceiling board 4, thereby enhancing an aesthetic aspect.

Also, the decorative board 6 has ventilation holes 9 and a module mounting hole 10 all defined therein. The ventilation holes 9 are holes for communicating the indoor air suction opening 2 in the body case 1 with an indoor space to allow indoor air to pass therethrough. As described later, the module mounting hole 10 is a hole in which a sensor module having an indoor environment detecting sensor installed therein is mounted. In the ventilation fan 50 according to the first embodiment, selected from among a human body detecting sensor module 36a having a human body detecting sensor installed therein, an illumination sensor module 36b having an illumination (illuminance) sensor installed therein, and a humidity sensor module 36c having a humidity sensor installed therein as the indoor environment detecting sensor, the human body detecting sensor module 36a and the illumination sensor module 36b are mounted in the module mounting hole 10.

The body unit 51 is provided with a module mount 37 for mounting thereon the two sensor modules 36a, 36b connected together via connectors. The module mount 37 is electrically connected to a fan controller provided in the body unit 51 to control the operation of the fan 1a. The sensor modules 36a, 36b are mounted in the module mounting hole 10 in the decorative board 6 by mounting the sensor modules 36a, 36b on the module mount 37.

Figure 3:
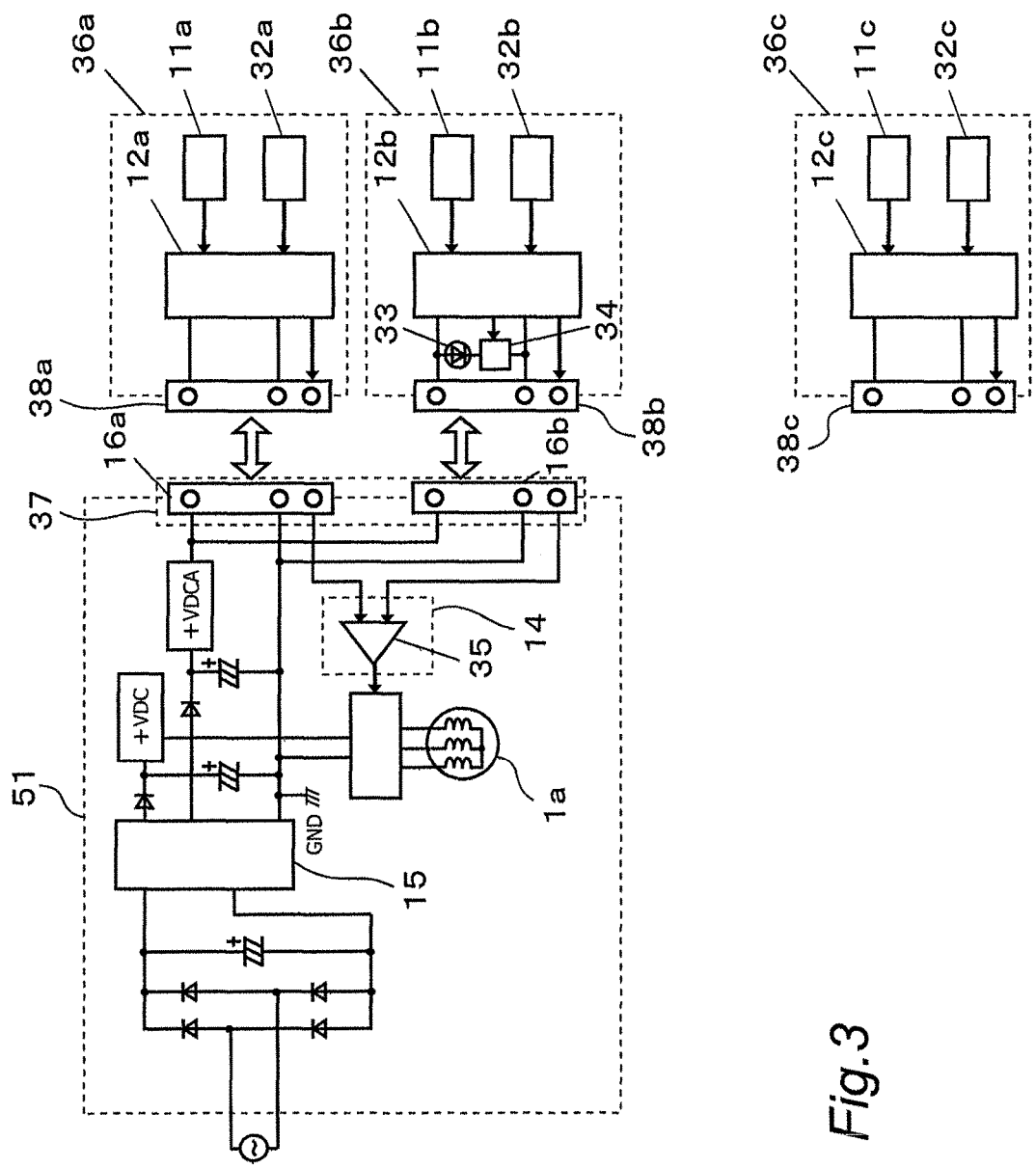
FIG. 3 is a control block diagram of the ventilation fan according to the first embodiment.

A control structure of the ventilation fan 50 is explained with reference to FIG. 3 depicting a control block diagram of the ventilation fan 50.

As shown in FIG. 3, the body unit 51 is provided with a fan controller for controlling the operation of the fan 1a and a power unit 15 to which the fan controller 14 and the fan 1a are connected. The fan controller 14 and the power unit 15 are mounted in, for example, the body case 1.

The module mount 37 is provided with two connectors 16a, 16b to connect the sensor modules 36 (36a, 36b). These connectors 16a, 16b are connected to the power unit 15 and the fan controller 14 to supply electric power from the power unit 15 to the sensor modules 36 and input information from the sensor modules 36 to the fan controller 14 via the connectors 16a, 16b.

The fan controller 14 is provided with a comparative arithmetic section 35 (arithmetic section) for calculating and determining the air volume of the fan 1a with the use of an algorism (control logic) set in advance based on the information (detected information) inputted from the sensor modules 36. The algorism used by the comparative arithmetic section 35 is described later.

The human body detecting sensor module 36a is provided with a human body detecting sensor 11a, a module controller 12a for controlling a detecting operation of the human body detecting sensor 11a, a sensitivity setting portion 32a for setting the sensitivity of the human body detecting sensor 11a, and a connector 38a connected to the module controller 12a.

The human body detecting sensor 11a has a function of detecting the presence or absence of a person in a room and detects, for example, infrared rays emitted from the person to convert them into a voltage, and detects the presence or absence of the person based on a voltage change. Such a human body detecting sensor 11a is generally referred to as a pyroelectric sensor. It is sufficient if the human body detecting sensor 11a has the function of detecting the presence or absence of a person in a room, and any other form of sensor may be used.

The sensitivity setting portion 32a is intended to set the sensitivity level of the human body detecting sensor 11a and may include, for example, a slide switch, a variable resistor or the like.

The module controller 12a determines the air volume to be conveyed by the fan 1a, based on a detection signal from the human body detecting sensor 11a and a sensitivity level set by the sensitivity setting portion 32a, to output air volume information so determined as the detected information to the fan controller 14. Also, the module controller 12a has a function of outputting identification information of the indoor environment detecting sensor, i.e., identification information of being a human body detecting sensor to the fan controller 14.

The illumination sensor module 36b is provided with an illumination sensor 11b, a module controller 12b for controlling a detecting operation of the illumination sensor 11b, a sensitivity setting portion 32b for setting the sensitivity of the illumination sensor 11b, and a connector 38b connected to the module controller 12b. The illumination sensor module 36b is further provided with a night light 33 and an illumination driver 34 for activating the night light 33.

The illumination sensor 11b has a function of detecting the indoor brightness (illuminance) and, for example, a converter for converting the amount of light into a voltage is used. The sensitivity setting portion 32b is intended to set the sensitivity level of the illumination sensor 11b.

The module controller 12b controls the lighting-up of the night light 33 via the illumination driver 34 based on a detection signal from the illumination sensor 11b and a sensitivity level set by the sensitivity setting portion 32b. Also, the module controller 12b outputs to the fan controller 14 detected information including a detection result of the illumination sensor 11b and the air volume to be conveyed by the fan 1a. Further, the module controller 12b has a function of outputting to the fan controller 14 identification information of the indoor environment detecting sensor, i.e., identification information of being an illumination sensor.

The humidity sensor module 36c is provided with a humidity sensor 11c, a module controller 12c for controlling a detecting operation of the humidity sensor 11c, a sensitivity setting portion 32c for setting the sensitivity of the humidity sensor 11c, and a connector 38c connected to the module controller 12c.

The humidity sensor 11c has a function of detecting the indoor humidity and, for example, a sensor of a resistance change type, a capacitance change type or the like for converting a humidity change into a voltage is used. The sensitivity setting portion 32c is intended to set the sensitivity level of the humidity sensor 11c.

The module controller 12c determines the air volume to be conveyed by the fan 1a, based on a detection signal from the humidity sensor 11c and a sensitivity level set by the sensitivity setting portion 32c, to output air volume information so determined as the detected information to the fan controller 14. Also, the module controller 12c has a function of outputting to the fan controller 14 identification information of the indoor environment detecting sensor, i.e., identification information of being a humidity sensor.

The connectors 38a-38c of the sensor modules 36a-36c have a common shape capable of being connected to the connectors 16a, 16b of the module mount 37. For this reason, arbitrary sensor modules selected from among the plurality of indoor environment detecting sensor modules can be connected to the connectors 16a, 16b of the module mount 37. Also, by disconnecting any one of the sensor modules connected once, another sensor module can be connected.

In this first embodiment, the case where the human body detecting sensor module 36a and the illumination sensor module 36b selected from among the plurality of indoor environment detecting sensor modules are mounted on the module mount 37 has been taken as an example, but any other sensor modules may be mounted.

The operation of the ventilation fan 50 is explained hereinafter with reference to an operation flowchart shown in FIG. 4.

Figure 4:
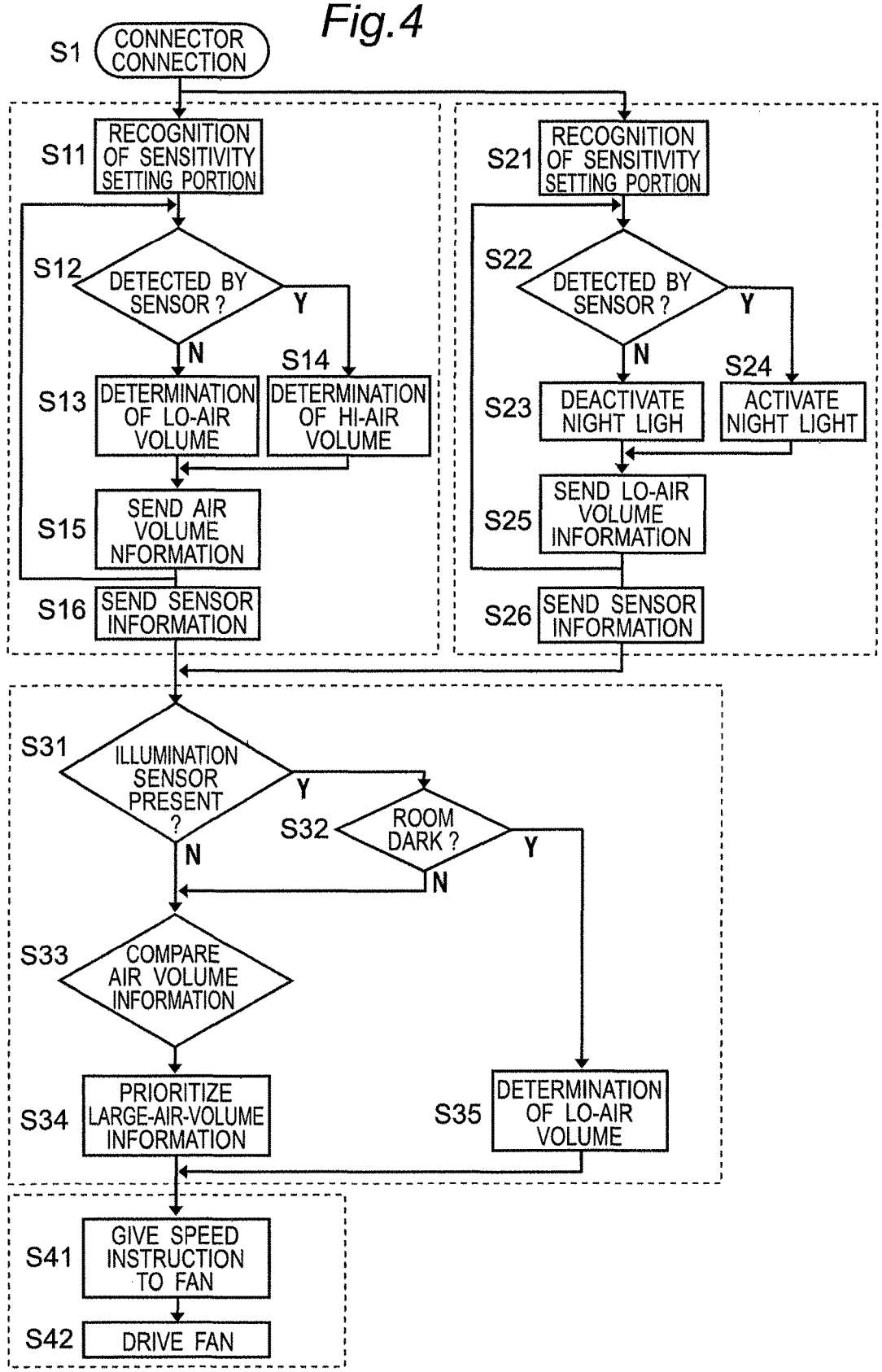
FIG. 4 is an operation flowchart of the ventilation fan according to the first embodiment.

As shown in FIG. 4, the power unit 15 of the ventilation fan 50 is powered on under a condition where the human body detecting sensor module 36a and the illumination sensor module 36b are connected to the body unit 51 of the ventilation fan 50 via the connectors (S1).

In the human body detecting sensor module 36a, the module controller 12a recognizes the sensitivity setting value of the sensitivity setting portion 32a (S11) to initiate a detecting operation of the human body detecting sensor 11a (S12). If the module controller 12a determines that a person is present in a room based on the sensitivity setting value and a detection signal from the human body detecting sensor 11a, a determination is made that the air volume to be conveyed by the fan 1a is to be set to a hi-air volume (strong wind) (S14). On the other hand, if the module controller 12a determines that no person is present in the room, a determination is made that the air volume to be conveyed by the fan 1a is to be set to a lo-air volume (weak wind) (S13). The module controller 12a outputs (sends) the air volume information so determined to the fan controller 14 (S15) and, at the same time, outputs (sends) the identification information of the human body detecting sensor 11a to the fan controller 14 (S16).

Also, in the illumination sensor module 36b, the module controller 12b recognizes the sensitivity setting value of the sensitivity setting portion 32b (S21) to initiate a detecting operation of the illumination sensor 11b (S22). If the module controller 12b determines that the indoor illuminance is low (dark) based on the sensitivity setting value and a detection signal from the illumination sensor 11b, the illumination driver 34 activates the night light 33 (S24). On the other hand, if the module controller 12b determines that the indoor illuminance is high (light), the illumination driver 34 deactivates the night light 33 (S23). The module controller 12b outputs (sends) a lo-air volume (weak wind) as the air volume to be conveyed by the fan 1a together with such illuminance detection information to the fan controller 14 (S25) and, at the same time, outputs (sends) the identification information of the illumination sensor 11b to the fan controller 14 (S26).

Next, the comparative arithmetic section 35 of the fan controller 14 executes processing of the information inputted from the sensor modules 36a, 36b using an algorism set in advance. More specifically, a determination is made as to whether or not the illumination sensor module 36b is connected based on the sensor identification information inputted from the sensor modules (S31). As in this first embodiment, if the illumination sensor module 36b is connected, a determination is made as to whether the indoor illuminance is high or low (light or dark) with reference to the inputted illuminance information (detection information) (S32). If information indicating that the indoor illuminance is low (dark) is inputted, a determination is made that the air volume to be conveyed by the fan 1a is to be set to a lo-air volume (weak wind) (S35). On the other hand, if information indicating that the indoor illuminance is high (light) is inputted, the air volume of the fan 1a is determined so as to prioritize large-air-volume information (S34) by comparing the air volume information inputted from the human body detecting sensor module 36a with the air volume information inputted from the illumination sensor module 36b (S33). If a determination is made that the illumination sensor module 36b is not connected (S31), upon comparison of the inputted air volume information (S33), the air volume of the fan 1a is determined so as to prioritize the large-air-volume information (S34).

The fan controller 14 gives an operation instruction (speed instruction) to the fan 1a based on the air volume so determined (S41) to operate the fan 1a in the determined air volume (S42).

Also, even during the operation of the fan 1*a*, the control operations at these steps (S1-S42) are repeatedly conducted so that the fan controller 14 can control the operation of the fan 1*a* based on the detection information of the sensor modules 36*a*, 36*b*.

The sensor module to be used as the indoor environment detecting sensor includes a human body detecting sensor, a temperature sensor, a humidity sensor, an illumination sensor, a carbon monoxide sensor or a carbon dioxide sensor. The operation flowchart of FIG. 4 takes the use of the human body detecting sensor module 36*a* and the illumination sensor module 36*b* as an example, but any sensor module including a temperature sensor, a humidity sensor, a carbon monoxide sensor or a carbon dioxide sensor is controlled at steps similar to those of the human body detecting sensor module 36*a*. That is, in such a sensor module, the air volume of the fan 1*a* is determined to be set to either one of the hi-air volume and the lo-air volume based on the detection information.

Consideration is given to a case where a humidity sensor module and an illumination sensor module 36*b* are mounted in the body unit 51, an illumination sensor 11*b* detects that a room is dark, and a humidity sensor detects that the humidity is high. In this case, with an emphasis on the detection information from the humidity sensor module rather than that from the illumination sensor module 36*b*, the algorism in the fan controller 14 may be weighted so as to set the air volume to a hi-air volume. Upon input of the sensor identification information from the respective sensor modules to the fan controller 14, the fan controller 14 identifies the kind of sensor modules mounted in the body unit 51 to perform a control based on an algorism appropriate for a combination of the sensors and the weighting. In this way, upon input of the sensor identification information from the sensor modules mounted in the body unit 51 to fan controller 14, the control appropriate for the features and the combination of the respective sensors can be performed.

In the above discussion, an explanation has been made about a case where two sensor modules 36 are selectively mounted on the sensor mount 37, but only one sensor module or more than three sensor modules may be mounted.

Also, the air volume of the fan 1*a* has been described as being set to either one of the hi-air volume and the lo-air volume, the former may be set to any one of a plurality of air volumes or may be set in a non-stepwise manner.

In the ventilation fan 50 according to the first embodiment referred to above, various sensor modules 36 can be mounted in the body unit 51 in a replaceable manner. In particular, each sensor module 36 is provided with a module controller 12 that controls the detecting operation of the indoor environment detecting sensor, determines the air volume to be conveyed by the fan 1*a*, and outputs the air volume information to the fan controller 14 of the body unit 51. Because of this, the sensor modules 36 can control a detecting operation appropriate for the respective sensors, and a control specification of the fan controller 14 can be made common with respect to various kinds of sensors, thus making it possible to selectively mount the sensor modules 36 in the body unit 51 depending on the functions required for an installation environment using the same body unit 51. Accordingly, the production or management cost of the ventilation fan can be reduced.

(Embodiment 2)

A ventilation fan according to a second embodiment of the present invention is explained hereinafter with reference to the drawings.

Figure 5:
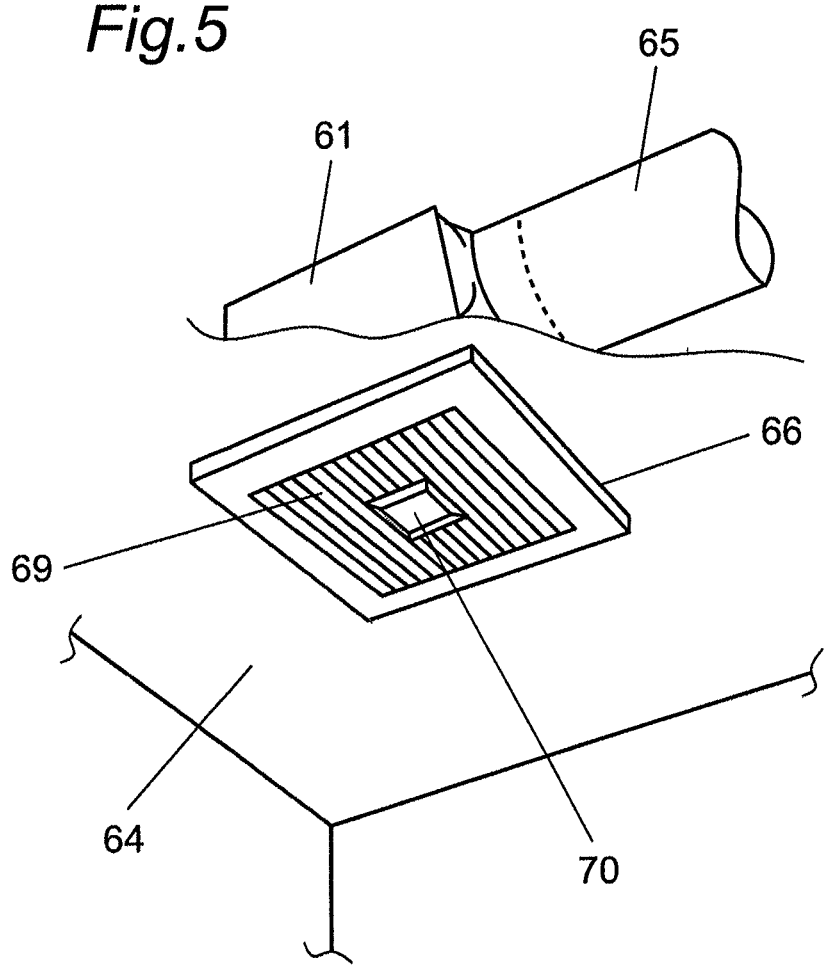
FIG. 5 is a partially cutaway perspective view of a ventilation fan according to a second embodiment of the present invention, showing an example of installation thereof.
Figure 6:
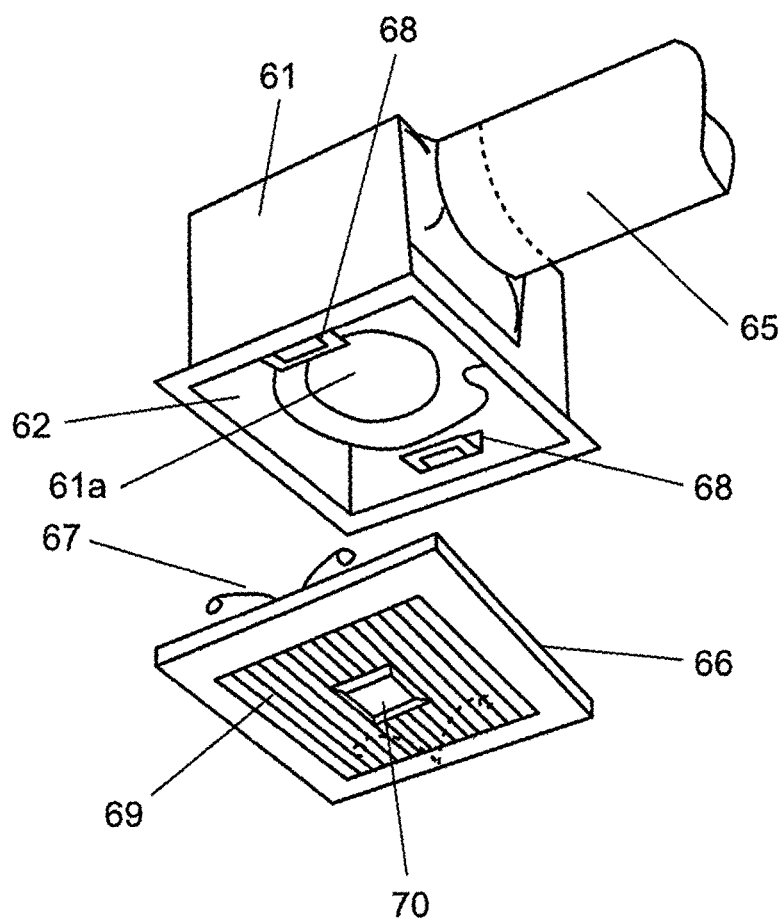
FIG. 6 is an exploded perspective view of the ventilation fan according to the second embodiment.
Figure 7:
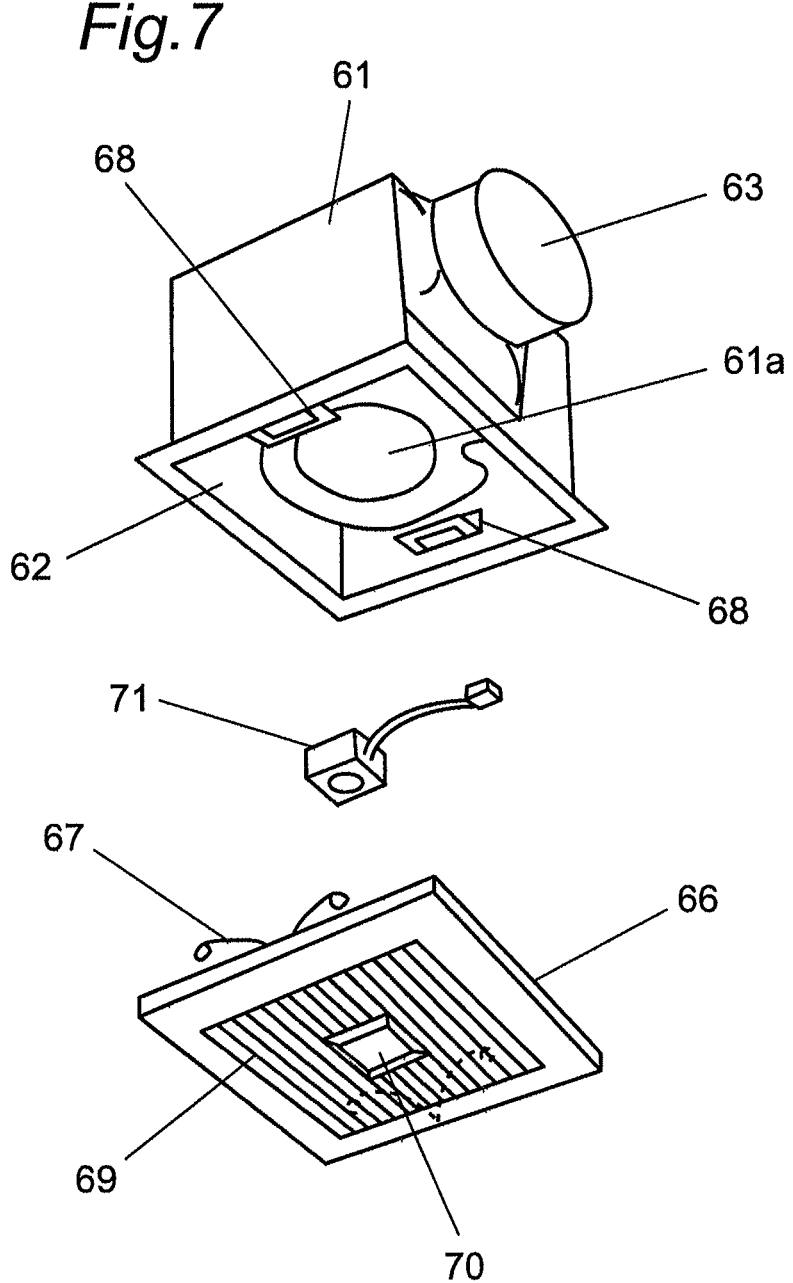
FIG. 7 is another exploded perspective view of the ventilation fan according to the second embodiment.

In FIG. 5 to FIG. 7, a box-shaped body case 61 of the ventilation fan according to the second embodiment has an indoor air suction opening 62 defined in a lower surface thereof and an indoor air discharge opening 63 defined in a side surface (or an upper surface) thereof. A fan 61*a* is accommodated within the body case 61.

As shown in FIG. 5, the body case 61 is mounted on an upper surface of a ceiling board 64, which has an opening (not shown) of a size nearly equal to that of the indoor air suction opening 62.

The indoor air discharge opening 63 in the body case 61 is connected to one end of a duct 65, the other end of which is extended to outdoors.

As shown in FIG. 5, the body case 61 is mounted on the upper surface of the ceiling board 64 and, in such a state, a decorative board 66 is removably mounted so as to cover the indoor air suction opening 62 from a lower surface of the ceiling board 64.

In mounting the decorative board 66 on the body case 61, a well-known structure is employed. Specifically, this work can be easily done by engaging attachment springs 67 of the decorative board 66 with respective mounting portions 68 of the body case 61.

The decorative board 66 has a shape greater than that of the indoor air suction opening 62 in the body case 61. Accordingly, the decorative board 66 can cover an opening (not shown) in the ceiling board 64 and the indoor air suction opening 62 from the lower surface side of the ceiling board 64, thereby enhancing an aesthetic aspect.

Also, the decorative board 66 has ventilation holes 69 and a sensor mounting hole 70 all defined therein. A human body detecting sensor (an example of the indoor environment detecting sensor) 71 is mounted in the sensor mounting hole 70.

Figure 8:
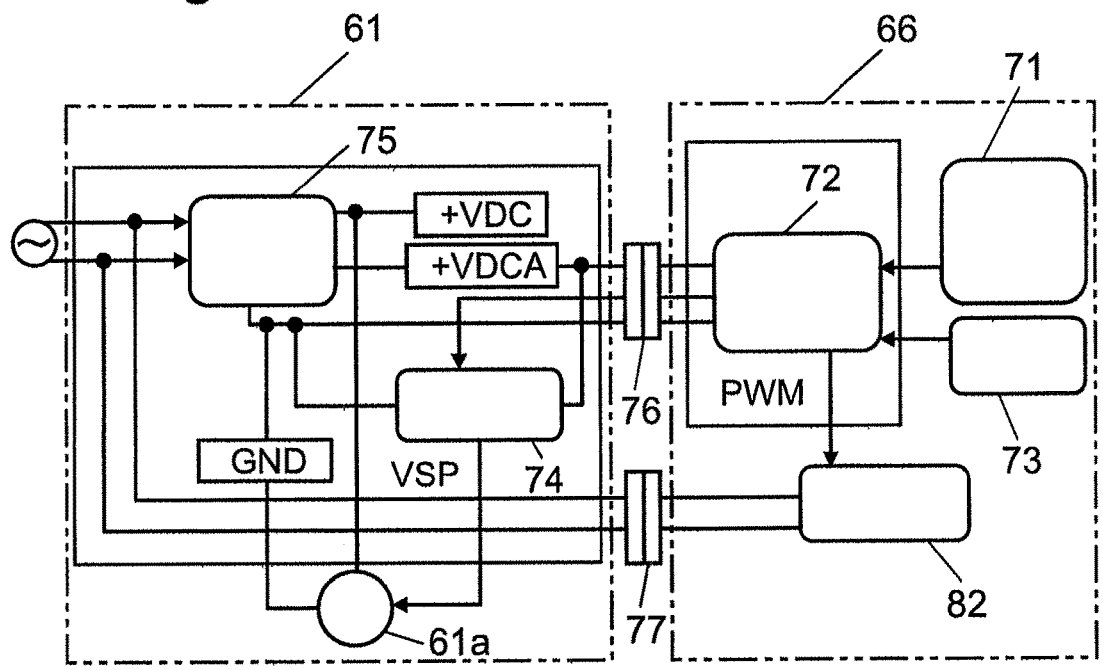
FIG. 8 is a control block diagram of the ventilation fan according to the second embodiment.

As shown in FIG. 8, the human body detecting sensor 71 is connected to a controller 72, to which a wireless remote controller receiver 73 and a fan controller 74 for controlling the fan 61*a* within the body case 61 are also connected.

The fan controller 74 is connected to the fan 61*a* and a power unit 75.

The power unit 75 is also connected to the controller 72 mounted on the decorative board 66 via a connector 76.

Further, the body case 61 is provided with a plurality of connectors 77 (only one connector 77 is shown to avoid complexity of the drawing) in addition to the connector 76.

That is, in the example shown in FIG. 5 to FIG. 7, the decorative board 66 having the human body detecting sensor 71 mounted thereon is mounted in the indoor air suction opening 62 in the body case 61. In place of the decorative board 66, a decorative board 78 shown in FIG. 9 or a decorative board 79 shown in FIG. 10 may be mounted in the indoor air suction opening 62 in the body case 61 depending on a difference in indoor environment.

Figure 9:
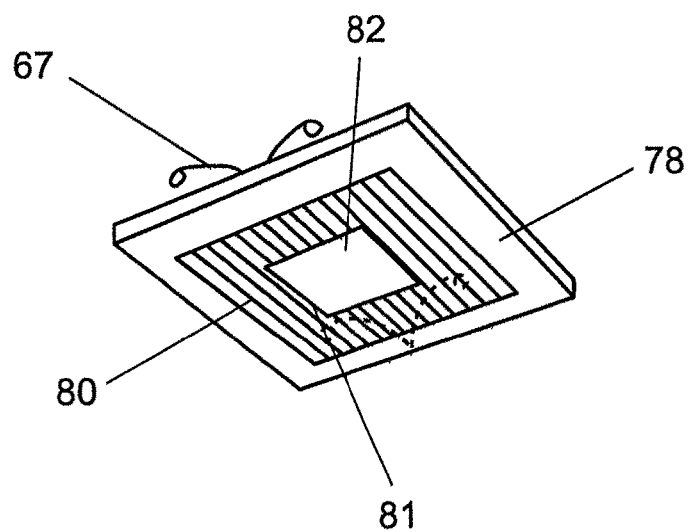
FIG. 9 is a perspective view showing another example of a decorative board of the ventilation fan according to the second embodiment.

By way of example, the decorative board 78 shown in FIG. 9 has ventilation holes 80 and a mounting hole 81 all defined therein. A human body detecting sensor (an example of the indoor environment detecting sensor) 71 and an illumination unit 82 are mounted in the mounting hole 81.

In this case, as shown in FIG. 9, the illumination unit 82 is supplied with electric power via the connector 77 and controlled by the controller 72 connected to the illumination unit 82.

Figure 10:
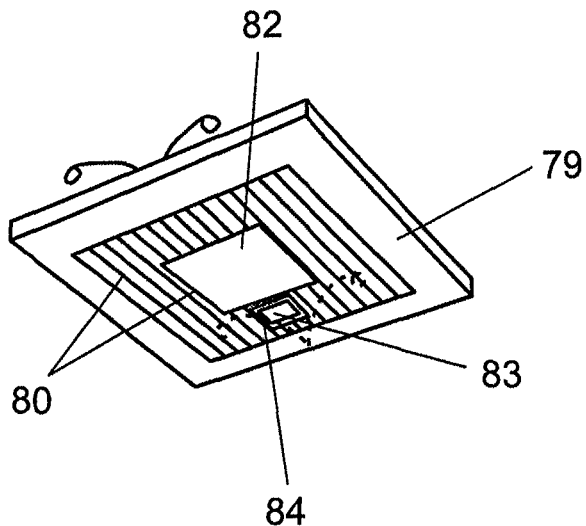
FIG. 10 is a perspective view showing a further example of the decorative board of the ventilation fan according to the second embodiment.

Further, in the decorative board 79 shown in FIG. 10, the mounting hole 81 is used to mount the illumination unit 82 therein and another mounting hole 84 is additionally provided to mount a separate indoor environment detecting sensor 83 therein.

The separate indoor environment detecting sensor 83 is at least one of, for example, a temperature sensor, a humidity sensor, a carbon monoxide sensor and a carbon dioxide sensor. As with the human body detecting sensor 71 of FIG. 8, this sensor is also connected to the controller 72.

Figure 11:
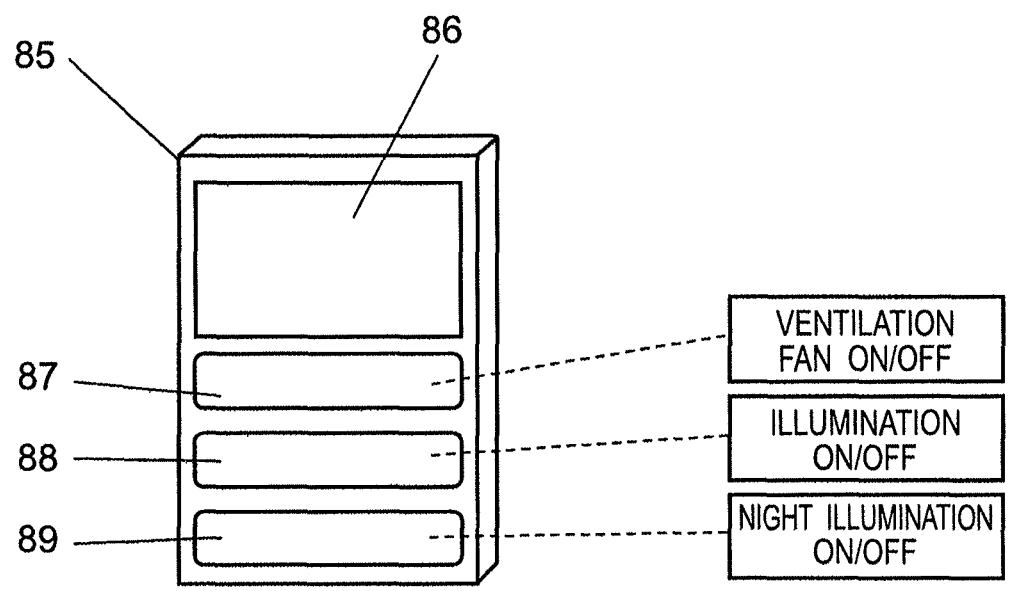
FIG. 11 is a perspective view of a remote controller of the ventilation fan according to the second embodiment.
Figure 12:
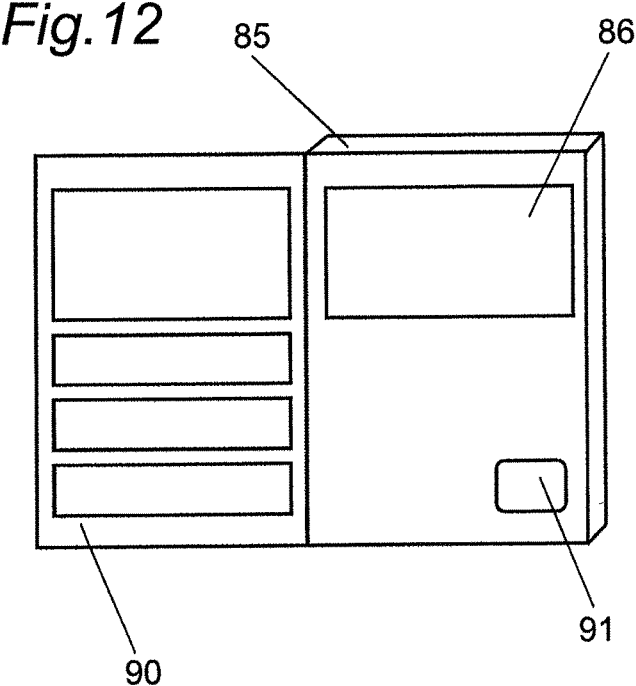
FIG. 12 is another perspective view of the remote controller of the ventilation fan according to the second embodiment with a lid opened.

This embodiment is characterized in that the operation of the decorative board 66, the decorative board 78 or the decorative board 79 can be performed by the wireless remote controller 85 shown in FIG. 11 or FIG. 12 with the decorative board mounted in the indoor air suction opening 62 in the body case 61.

That is, in this embodiment, the decorative board 66, the decorative board 78 or the decorative board 79 is mounted in the indoor air suction opening 62 in the body case 61 depending on an environment of a room in which the ventilation fan is installed, thereby making it possible to achieve a ventilation fan function depending on each environment.

Accordingly, the body case 61 can have a common specification and any one of a plurality of decorative boards can be selectively mounted depending on the environment, thus resulting in a reduction in various costs.

In order to realize the configuration of this embodiment, the fan controller 74 is connected to the fan 61a in the body case 61 and the wireless remote controller receiver 73 is connected to the controller 72 of the decorative board 66, 78, 79.

Further, the controller 72 is connected to the fan controller 74 and configured such that a control operation can be changed by a signal received from the remote controller receiver 73.

By way of example, the air volume of the fan 61a or the control operation to be performed based on the human body detecting sensor (an example of the indoor environment detecting sensor) 71 or any other indoor environment detecting sensor 83 can be easily changed by a command from the remote controller 85.

For this reason, it is not necessary to prepare a plenty of models to respond to various environments, thus resulting in a reduction in various costs.

As with a known structure of a remote controller of, for example, an air conditioner, a basic structure of the remote controller 85 is created so as to emit infrared signals (an example of wireless type) and, hence, the following explanation is simplified to avoid complexity of the explanation.

As shown in FIG. 11, a liquid crystal display 86 is provided on a surface of the remote controller 85. Also, an operating portion 87 for turning a ventilating function on and off, an operating portion 88 for turning the illumination unit 82 on and off, and an operating portion 89 for turning a night illumination function on and off are provided below the display 86 on the surface.

Also, as shown in FIG. 12, an operating portion 91 for setting the air volume of the fan 61a is exposed by opening a lid 90 mounted on the surface.

Infrared signals are emitted by operating the operating portions 87, 88, 89 and received by the remote controller receiver 73 of FIG. 8 for subsequent various settings.

Specifically, as shown in FIG. 5 to FIG. 7, when the decorative board 66 has been mounted in the indoor air suction opening 62 in the body case 61, the ventilating function is turned on by the operating portion 87 of the remote controller 85 and the air volume of the fan 61a is set by the operating portion 91.

That is, because the decorative board 66 is not provided with the illumination unit 82, the operating portions 88, 89 associated with illumination are not operated.

On the other hand, when the decorative board 78 of FIG. 9 or the decorative board 79 of FIG. 10 has been mounted in the indoor air suction opening 62 in the body case 61, the ventilating function is turned on by the operating portion 87 of the remote controller 85, the illumination unit 82 is turned on and off by the operating portion 88, the night illumination function is turned on and off by the operating portion 89, and the air volume of the fan 61a is subsequently set by the operating portion 91.

Figure 13:
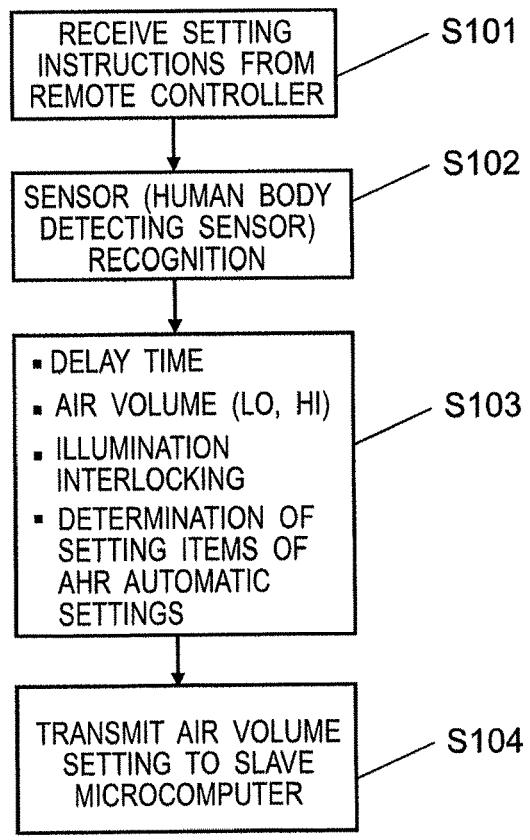
FIG. 13 is an operation flowchart of the ventilation fan according to the second embodiment.

That is, upon receipt of various setting instructions from the remote controller receiver 73 (S101 in FIG. 13), the controller 72 of FIG. 8 makes operation settings based on the human body detecting sensor (an example of the indoor environment detecting sensor) 71 (S102 in FIG. 13), subsequently makes settings for the speed-dependent air volume (S202 in FIG. 14), an on-off operation of the illumination unit 82, an on-off operation of the night illumination function and the like (S103 in FIG. 13), and then transmits fan control settings to the fan controller 74 in the body case 61 (S104 in FIG. 13).

Figure 14:
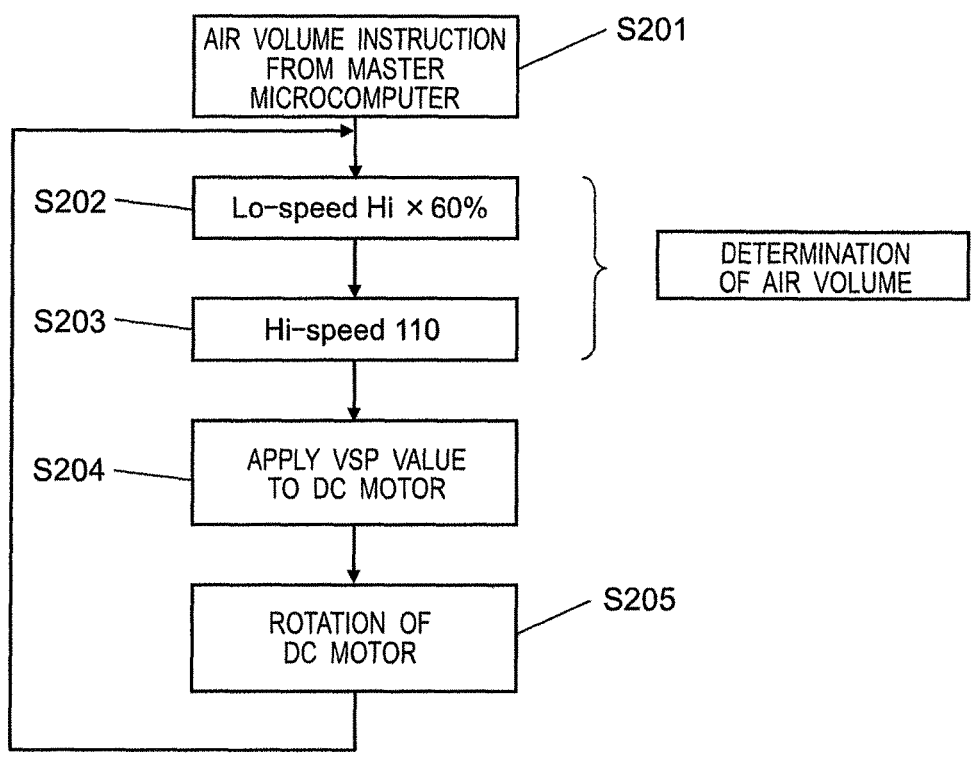
FIG. 14 is another operation flowchart of the ventilation fan according to the second embodiment.

Upon receipt of an air volume instruction from the controller 72 (S201 in FIG. 14), the fan controller 74 sets, for example, the fan speed at the time of the lo-air volume (weak wind) (S202 in FIG. 14) and the fan speed at the time of the hi-air volume (strong wind) (S203 in FIG. 14). Then, the fan controller 74 supplies the fan 61a, in which a direct-current motor is used, with a direct-current voltage tailored to the setting conditions (S204 in FIG. 14) to thereby drive the fan 61a (S205 in FIG. 14).

When the fan 61a is driven, indoor air is taken into the body case 61 through the decorative board 66, the decorative board 78 or the decorative board 79 and then discharged outdoors from the indoor air discharge opening 63 through the duct 65, thereby providing ventilation.

As just described, in the second embodiment, any one of the decorative board 66, the decorative board 78 and the decorative board 79 is mounted in the indoor air suction opening 62 in the body case 61 depending on an environment of a room in which the ventilation fan is installed, thereby making it possible to achieve a ventilation fan function depending on each environment.

Accordingly, the body case 61 can be commonly used, thus resulting in a reduction in various costs.

Although in the second embodiment referred to above the wireless remote controller receiver 73 has been described as being mounted on the decorative board 78, the remote controller receiver 73 may be mounted on the body case 61 side.

Also, although in the second embodiment the remote controller receiver 73 has been described as being of a wireless type, it may be of a wired type. That is, in this case, the remote controller 85 referred to above is also of a wired type, and this wired type remote controller 85 and the wired type remote controller receiver 73 are connected to each other via lead wires.

Naturally, such a wired type remote controller receiver 73 may be mounted on the decorative board 78 or the body case 61.

As in the ventilation fan according to the second embodiment, the idea of realizing a ventilation fan function tailored to each environment by selectively mounting the decorative board 6, 18, 19, on which the indoor environment detecting sensor 83 is mounted, in the indoor air suction opening 62 in the body case 61 depending on an environment of a room in which a ventilation fan is installed is applicable to the ventilation fan according to the first embodiment referred to above. By way of example, ventilation fan functions can be realized depending on various environments. by replacing a decorative board having a sensor module mounted thereon with another decorative board having a different sensor module mounted thereon.

Also, the operations with the use of the remote controller 25 of the ventilation fan according to the second embodiment are applicable to the ventilation fan according to the first embodiment referred to above. By way of example, if the remote controller receiver 73 is provided in the module controller of the sensor module, communications can be performed between the remote controller and the module controller.

(Embodiment 3)

A ventilation fan according to a third embodiment of the present invention is explained hereinafter with reference to the drawings.

Figure 15:
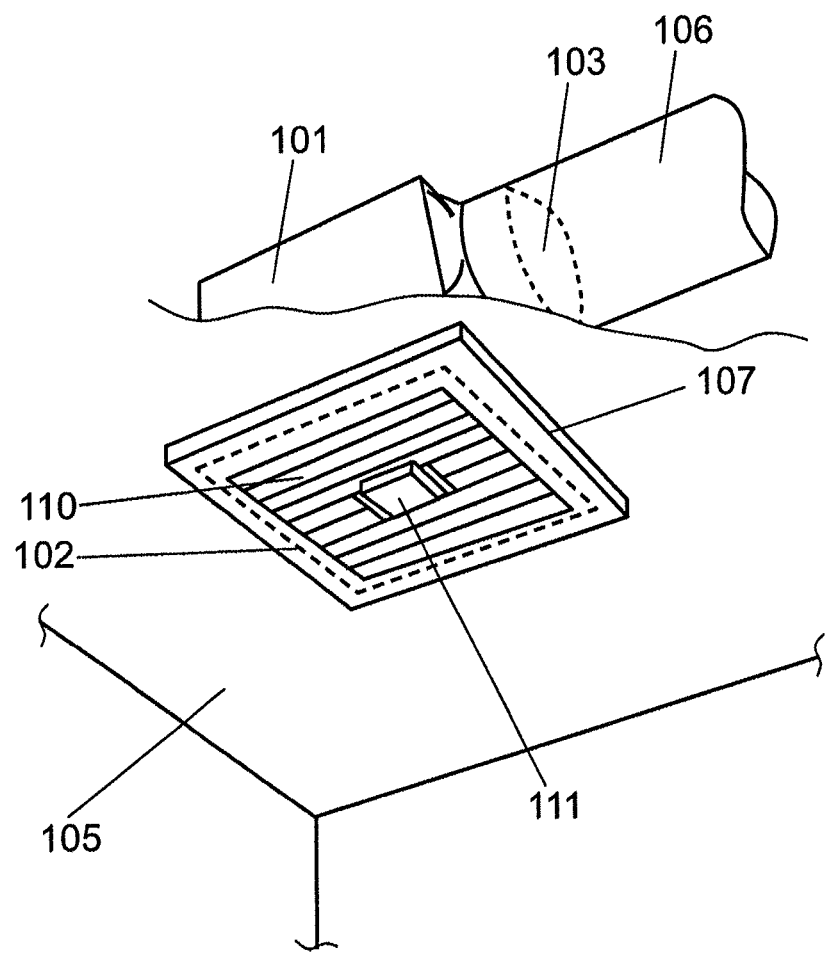
FIG. 15 is a partially cutaway perspective view of a ventilation fan according to a third embodiment of the present invention, showing an example of installation thereof.
Figure 16:
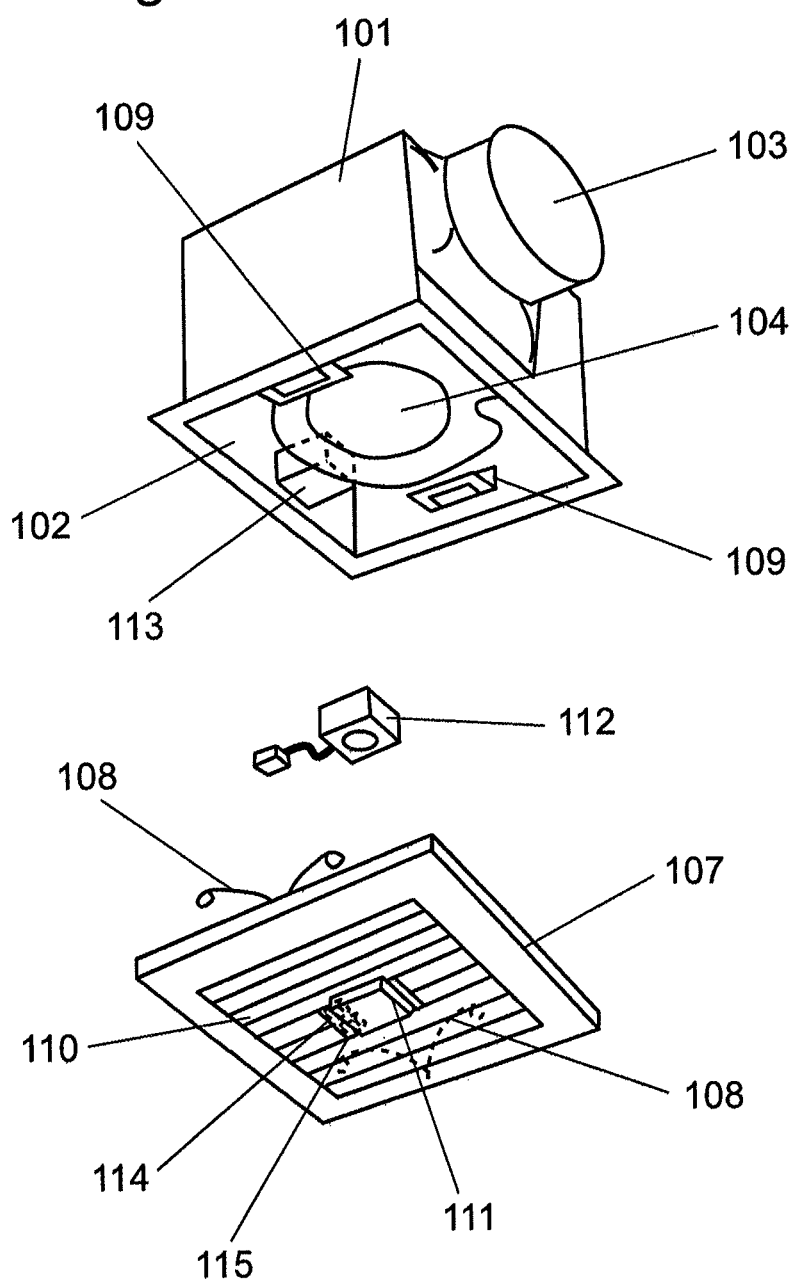
FIG. 16 is an exploded perspective view showing a configuration of the ventilation fan according to the third embodiment.

In FIG. 15 and FIG. 16, a box-shaped body case 101 of the ventilation fan according to the third embodiment has an indoor air suction opening 102 defined in a lower surface thereof and an indoor air discharge opening 103 defined in a side surface (or an upper surface) thereof. A fan 104 is accommodated within the body case 101.

As shown in FIG. 15, the body case 101 of the ventilation fan is mounted on an upper surface of a ceiling board 105, which has an opening (not shown) of a size nearly equal to that of the indoor air suction opening 102. The indoor air discharge opening 103 in the body case 101 of the ventilation fan is connected to one end of a duct 106, the other end of which is extended outdoors.

Also, as shown in FIG. 15, the body case 101 is mounted on the upper surface of the ceiling board 105. In such a state, a decorative board 107 is removably mounted so as to cover the indoor air suction opening 102 from a lower surface of the ceiling board 105.

In mounting the decorative board 107 on the body case 101, a well-known structure is employed. Briefly explaining, this work can be easily done by engaging attachment springs 108 of the decorative board 107 with respective mounting portions 109 of the body case 101.

Because the decorative board 107 is greater than the indoor air suction opening 102 in the body case 101, the decorative board 107 can cover an opening (not shown) in the ceiling board 105 and the indoor air suction opening 102 from the lower surface side of the ceiling board 105, thereby enhancing an aesthetic aspect while ensuring air permeability.

As shown in FIG. 16, the decorative board 107 has ventilation holes 110 and an indoor environment detecting unit-mounting hole 111 all defined therein. An indoor environment detecting unit 112 (for example, a human body detecting sensor) having at least one sensor is mounted in the indoor environment detecting unit-mounting hole 111.

Also, as shown in FIG. 16, the body case 101 accommodates a contactless power transmitting unit 113 therein, which supplies the decorative board 107 side with electric power in a contactless manner and receives a control operation signal of the fan 104 from the decorative board 107 side.

The decorative board 107 is provided with a decorative board-contactless power transmitting unit 114 disposed at a location confronting the contactless power transmitting unit 113 so as to receive electric power from the contactless power transmitting unit 113 and to send the control operation signal of the fan 104 to the contactless power transmitting unit 113.

The decorative board 107 is also provided with a controller 115 connected to the decorative board-contactless power supply unit 114 so as to work upon receipt of power supply.

Figure 17:
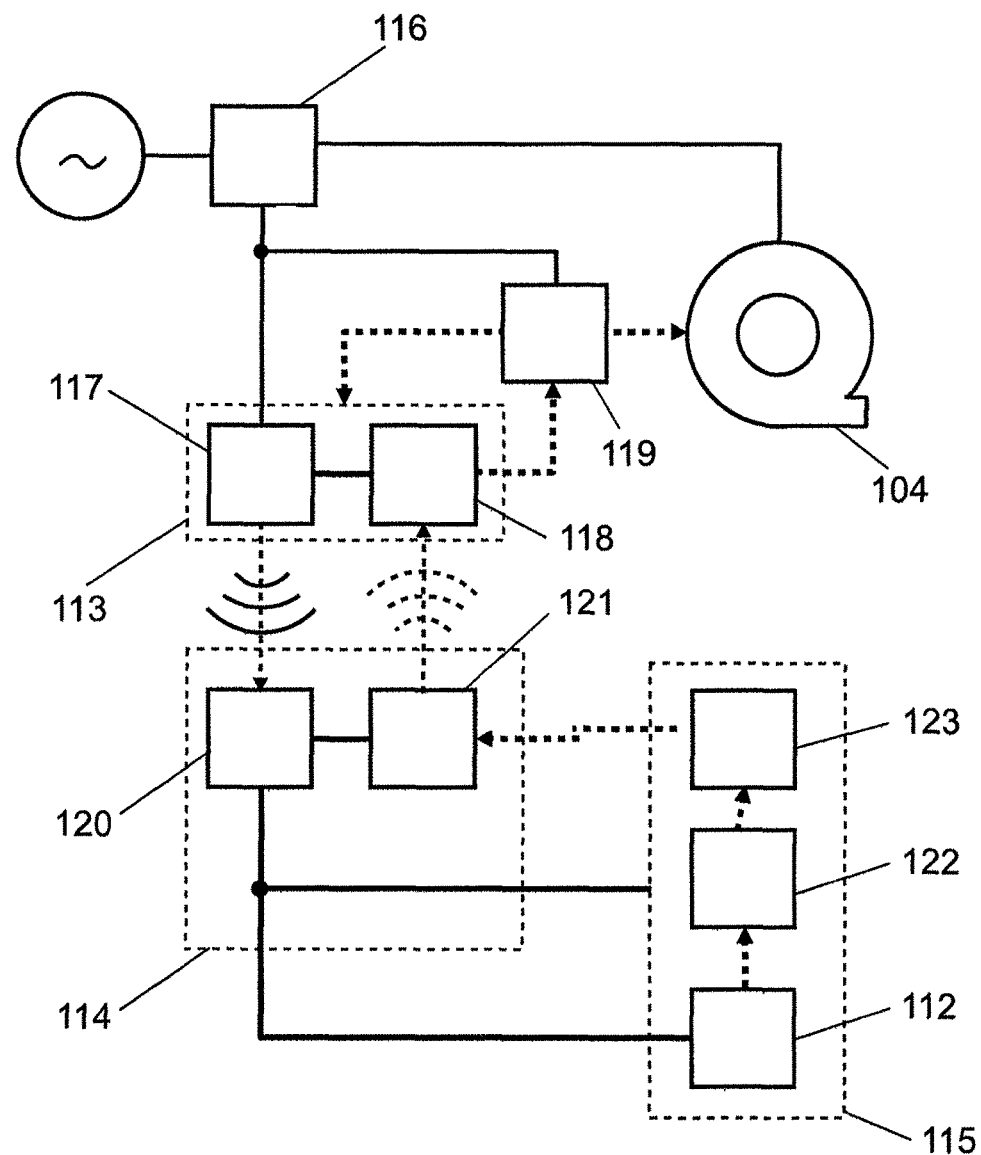
FIG. 17 is a schematic block diagram showing the configuration of the ventilation fan according to the third embodiment.

As shown in FIG. 17, the contactless power transmitting unit 113 includes a power transmitting means 117 for receiving power supply from a power unit 116, which rectifies and smooths a commercially available power source provided in the body case 101 to generate a desired voltage, to supply the decorative board 107 side with electric power. The contactless power transmitting unit 113 also includes a receiving means 118 for receiving a control operation signal of the fan 104 from the decorative board 107 side.

The receiving means 118 is connected to a fan controller 119 that controls the fan 104 based on the control operation signal of the fan 104 received from the decorative board 107 side.

The power transmitting means 117 includes, for example, an electromagnetic induction coil for transmitting electric power using an inductive current produced by a magnetic field between opposed coils. The receiving means 118 includes, for example, an electromagnetic induction coil for transmitting a communication signal using an inductive current produced by a magnetic field between opposed coils.

Also, as shown in FIG. 17, the decorative board-contactless power transmitting unit 114 confronting the contactless power transmitting unit 113 includes a power receiving means 120 for receiving electric power from the power transmitting means 117 of the contactless power transmitting unit 113 and a transmitting means 121 for transmitting a control operation signal to the receiving means 118.

The power receiving means 120 includes, for example, an electromagnetic induction coil for transmitting electric power using an inductive current produced by a magnetic field between opposed coils. The transmitting means 121 includes, for example, an electromagnetic induction coil for transmitting a communication signal using an inductive current produced by a magnetic field between opposed coils.

As shown in FIG. 17, the controller 115 is provided with an indoor environment detecting unit 112, an operation decision portion 122 for determining the operation of the fan 104 based on an environment detected by the indoor environment detecting unit 112, and a control operation signal-generating portion 123 for outputting a control operation signal to the transmitting means 121 based on the operation determined by the operation decision portion 122.

In the above-described configuration, because the indoor environment detecting unit 112 is comprised of a human body detecting sensor, if a person in a room is not detected, the operation decision portion 122 determines, upon receipt of a detection signal from the indoor environment detecting unit 112, a lo-air volume (for example, 50 m$^3$/h) as a minimum air volume required for ventilation of indoor air with the use of the air volume of the fan 104.

Next, if a person in a room is detected, the detection signal from the indoor environment detecting unit 112 is transmitted to the operation decision portion 122 of the controller 115, which in turn compares the detection signal with an arbitrary threshold value to determine a change from the previously-determined lo-air volume (for example, 50 m$^3$/h) of the fan 104 to a hi-air volume (for example, 100 m$^3$/h) as a given air volume of the fan 104 at a time when the person is detected in the room.

The control operation signal-generating portion 123 outputs the generated control operation signal based on the determined air volume to the transmitting means 121 of the decorative board-contactless power transmitting unit 114.

The control operation signal transmitted to the transmitting means 121 is then transmitted to the fan controller 119 through the receiving means 118 of the contactless power transmitting unit 113 so that the fan controller 119 may change the air volume of the fan 104 from the lo-air volume to the hi-air volume.

Also, when no person is detected, after a lapse of a predetermined period of time (for example, ten minutes), the operation decision portion 122 determines the air volume to be conveyed by the fan 104 (for example, the previously-set air volume (lo-air volume)), and the air volume so determined is transmitted as the control operation signal from the decorative board-contactless power transmitting unit 114 to the fan controller 119 through the contactless power transmitting unit 113. By doing so, the fan controller 119 changes the air volume of the fan 104 from the hi-air volume to the lo-air volume.

As just described, in the third embodiment, the contactless power transmitting unit 113 supplies the decorative board-contactless power transmitting unit 114 with electric power to operate the controller 115.

Also, in the controller 115, the operation decision portion 122 determines the operation of the fan 104 based on the detection signal detected by the indoor environment detecting unit 112, and the control operation signal-generating portion 123 generates a control operation signal corresponding to the operation determined by the operation decision portion 122.

The control operation signal so generated is transmitted to the contactless power transmitting unit 114 through the decorative board-contactless power transmitting unit 114 and then to the fan controller 119.

The fan controller 119 changes the control operation of the fan 104 based on the control operation signal referred to above, thus making it possible to easily realize the control operation based on the indoor environment detecting unit 112.

That is, the operation of the fan 104 can be determined and changed by the operation decision portion 122 based on the indoor environment detected by the indoor environment detecting unit 112.

In summary, the controller 115 of the decorative board 107 is supplied with electric power that has been received by the power receiving means 120 from the contactless power transmitting unit 113 on the body case 101 side. Then, the operation decision portion 122 determines the operation of the fan 104 based on the indoor environment detected by the indoor environment detecting unit 112, and the control operation signal-generating portion 123 outputs the control operation signal to the transmitting means 121 based on the determined operation of the fan 104. The control operation signal is subsequently received by the receiving means 118 of the body case 101 to allow the fan controller 119 to control the fan 104, thus making it possible to perform transmission and reception of the electric power and the signals in a contactless manner.

That is, without the need of a wired connection, various problems caused by the wired connection, i.e., a loss in air volume and wind noises caused by an airflow disturbance of the fan 104 can be reduced. In addition to this, wires connected to the sensor of the decorative board 107 for power supply and communication signals are not required, thus enhancing convenience during cleaning or maintenance.

As in the ventilation fan according to the third embodiment, the idea of performing power supply and transmission of the control operation signal in a contactless manner between the contactless power transmitting unit 113 mounted in the body case 101 and the decorative board-contactless power transmitting unit 114 mounted on the decorative board 107 is applicable to the ventilation fan according to the first embodiment referred to above. By way of example, the sensor module and the body unit may be provided with respective contactless power transmitting units so that power supply and transmission of the control operation signal may be performed in a way that the sensor module is not wire-connected to the fan controller of the body unit. In this configuration, wires for power supply to the sensor module and for communication signals are not required, thus enhancing convenience during cleaning or maintenance and facilitating replacement of the sensor module.

(Embodiment 4)

A ventilation fan according to a fourth embodiment of the present invention is explained hereinafter with reference to the drawings.

Figure 18:
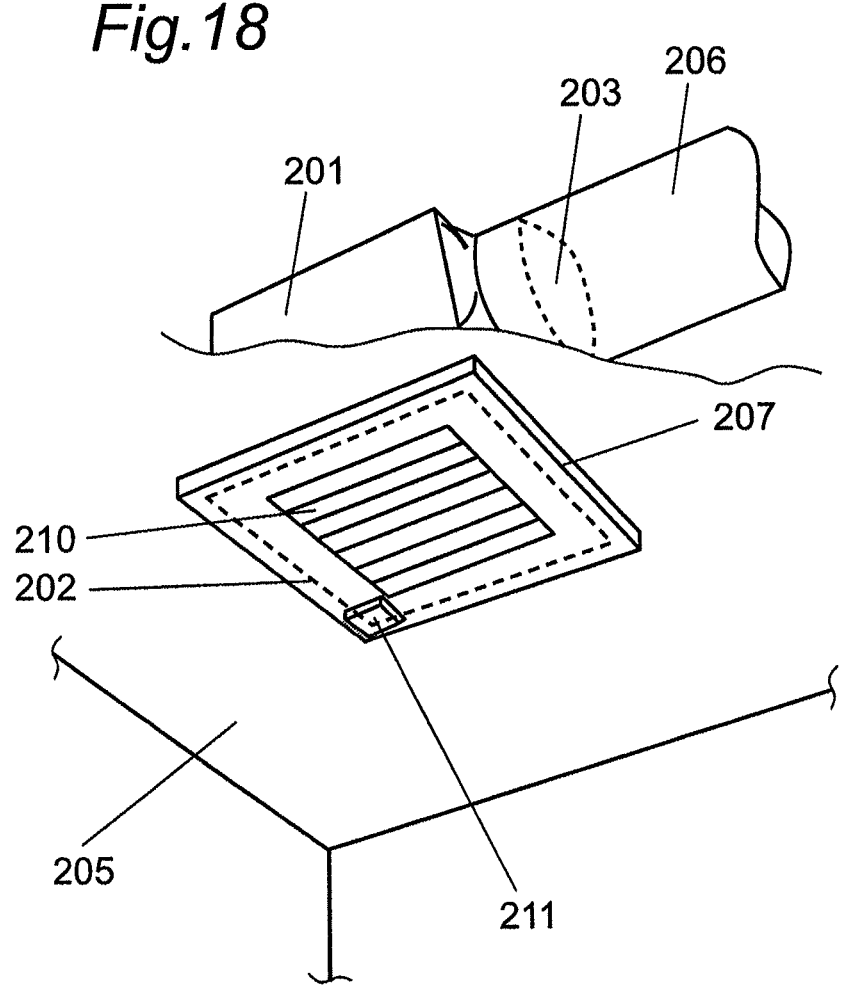
FIG. 18 is a partially cutaway perspective view of a ventilation fan according to a fourth embodiment of the present invention, showing an example of installation thereof.
Figure 19:
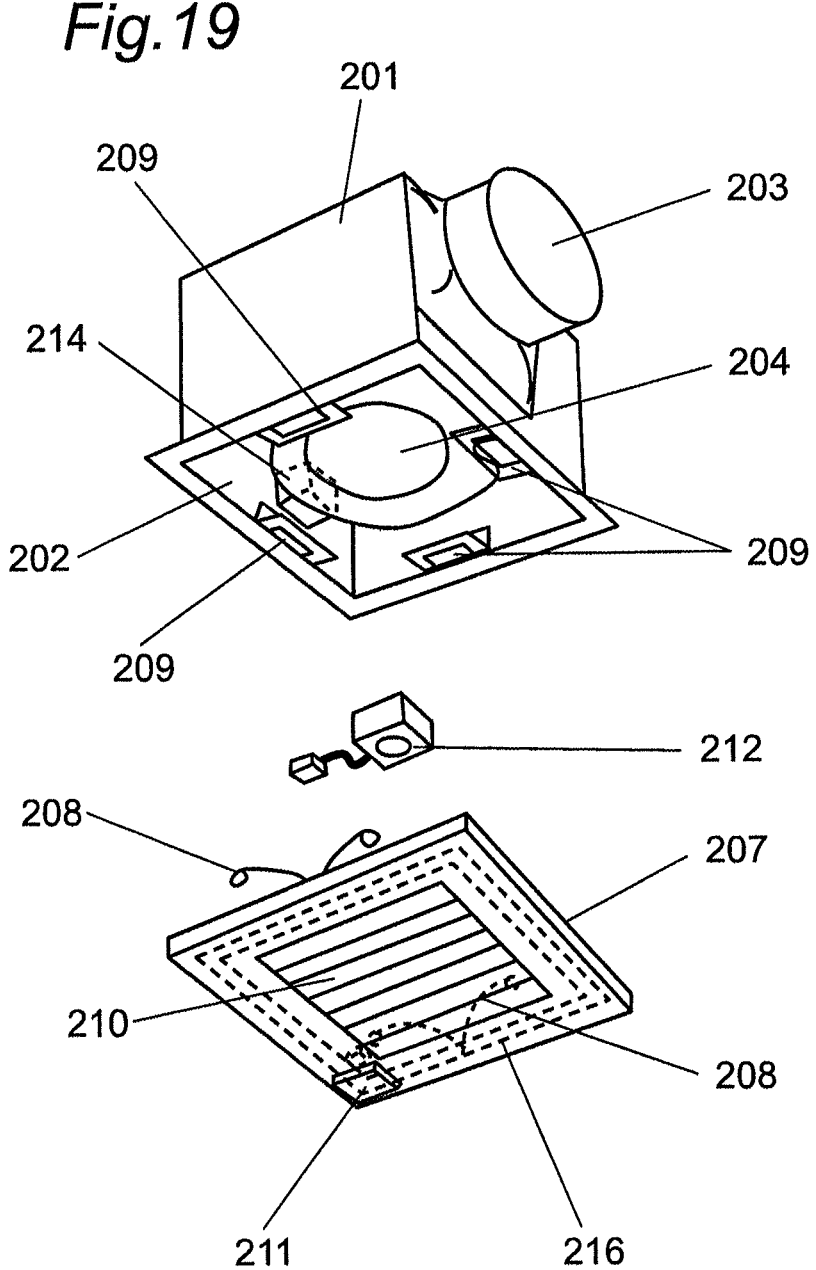
FIG. 19 is an exploded perspective view showing a configuration of the ventilation fan according to the fourth embodiment.

In FIG. 18 and FIG. 19, a box-shaped body case 201 of the ventilation fan according to the fourth embodiment has a square indoor air suction opening 202 defined in a lower surface thereof and an indoor air discharge opening 203 defined in a side surface (or an upper surface) thereof. A fan 204 is accommodated within the body case 201.

As shown in FIG. 18, the body case 201 of the ventilation fan is mounted on an upper surface of a ceiling board 205, which has an opening (not shown) of a size equal to that of the indoor air suction opening 202. The indoor air discharge opening 203 in the body case 201 of the ventilation fan is connected to one end of a duct 206, the other end of which is extended to outdoors.

Also, as shown in FIG. 18, the body case 201 is mounted on the upper surface of the ceiling board 205. In such a state, a decorative board 207 is mounted so as to cover the indoor air suction opening 202 from a lower surface of the ceiling board 205.

In consideration of the ease of forming the opening in the ceiling board, the indoor air suction opening 202 is in the form of a square.

Because the decorative board 207 is greater than the indoor air suction opening 202 in the body case 201, the decorative board 207 can cover an opening (not shown) in the ceiling board 205 and the indoor air suction opening 202 from the lower surface side of the ceiling board 205, thereby enhancing an aesthetic aspect while ensuring air permeability.

The decorative board 207 is formed into a square in conformity with the shape of the indoor air suction opening 202 and can be accordingly removably mounted in any one of a plurality of directions with a center thereof positioned on a center of the body case.

In mounting the decorative board 207 on the body case 201, a well-known structure is employed. Specifically, as shown in FIG. 19, this work can be easily done by engaging two attachment springs 208, which are mounted to the decorative board 207 at opposed two sides, with respective mounting portions 209 of the body case 201.

As shown in FIG. 19, the decorative board 207 has ventilation holes 210 and an indoor environment detecting unit-mounting hole 211 all defined therein.

The ventilation holes 210 are positioned at a central portion of the decorative board 207 and the indoor environment detecting unit-mounting hole 211 is positioned at a corner portion of the decorative board 207.

An indoor environment detecting unit 212 (for example, a human body detecting sensor) having at least one sensor is mounted in the indoor environment detecting unit-mounting hole 211.

As shown in FIG. 19, the mounting portions 209 are positioned at four locations along respective sides of the indoor air suction opening 202 and, hence, the decorative board 208 can be mounted on the body case 201 in any one of a plurality of directions by rotating the attachment springs 208 with respect to the mounting portions 209 at angular intervals of 90 degrees.

Figure 21:
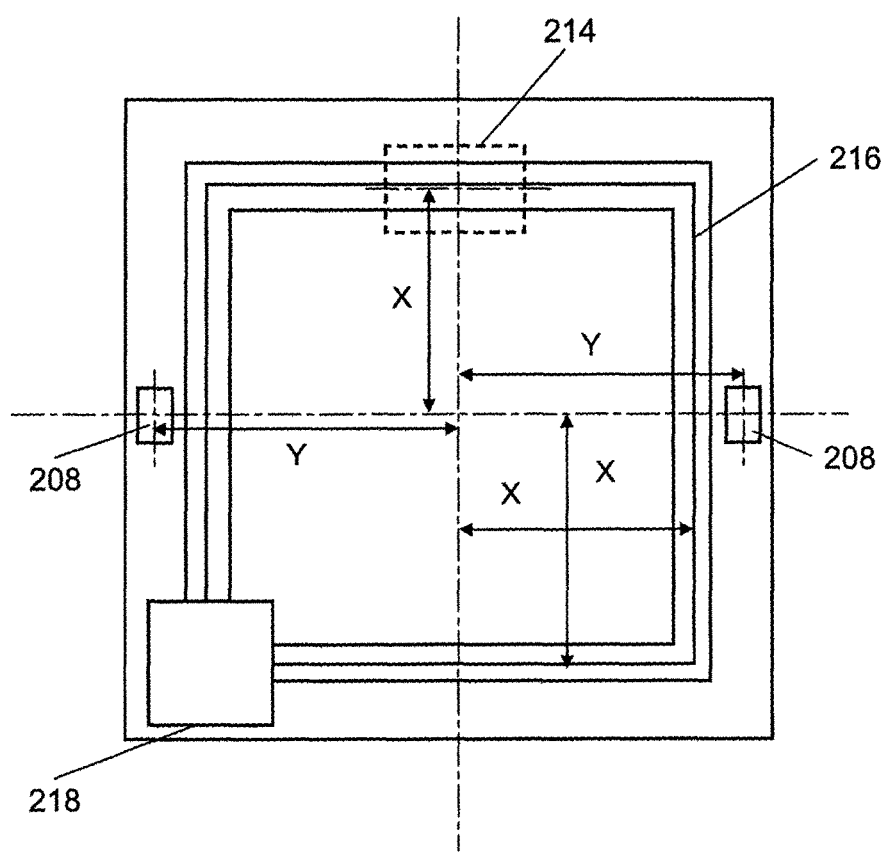
FIG. 21 is a configuration diagram showing a positional relationship in the configuration of the ventilation fan according to the fourth embodiment.

As shown in FIG. 21, the attachment springs 208 are positioned a distance Y away from the center of the decorative board 207.

Also, the configuration of the attachment springs 208 and the mounting portions 209 can be realized, for example, in such a way that claws formed on or with the decorative board 207 are engaged with those formed on or with the body case 201.

Also, the number of orientations of the decorative board 207 can be increased by forming the indoor air suction opening 202 and the decorative board 207 into a point-symmetric shape (for example, a circle, a regular polygon or the like).

As shown in FIG. 19, the body case 201 accommodates therein a power supply unit 213 for generating a desired voltage by rectifying and smoothing a commercially available power source and a body side contactless power transmitting and receiving unit 215 positioned a predetermined distance X away from the center of the body case 201 in a lateral direction.

The body side contactless power transmitting and receiving unit 215 includes a body side coil unit 214 for receiving power supply from the power supply unit 213 to supply the decorative board 207 side with electric power in a contactless manner and for receiving a control operation signal of the fan 204 from the decorative board 207 side.

As shown in FIG. 21, it is particularly preferred that the body side coil unit 214 of the body side contactless power transmitting and receiving unit 215 be positioned at a location laterally a predetermined distance X away from the center of the body case 201.

Figure 20:
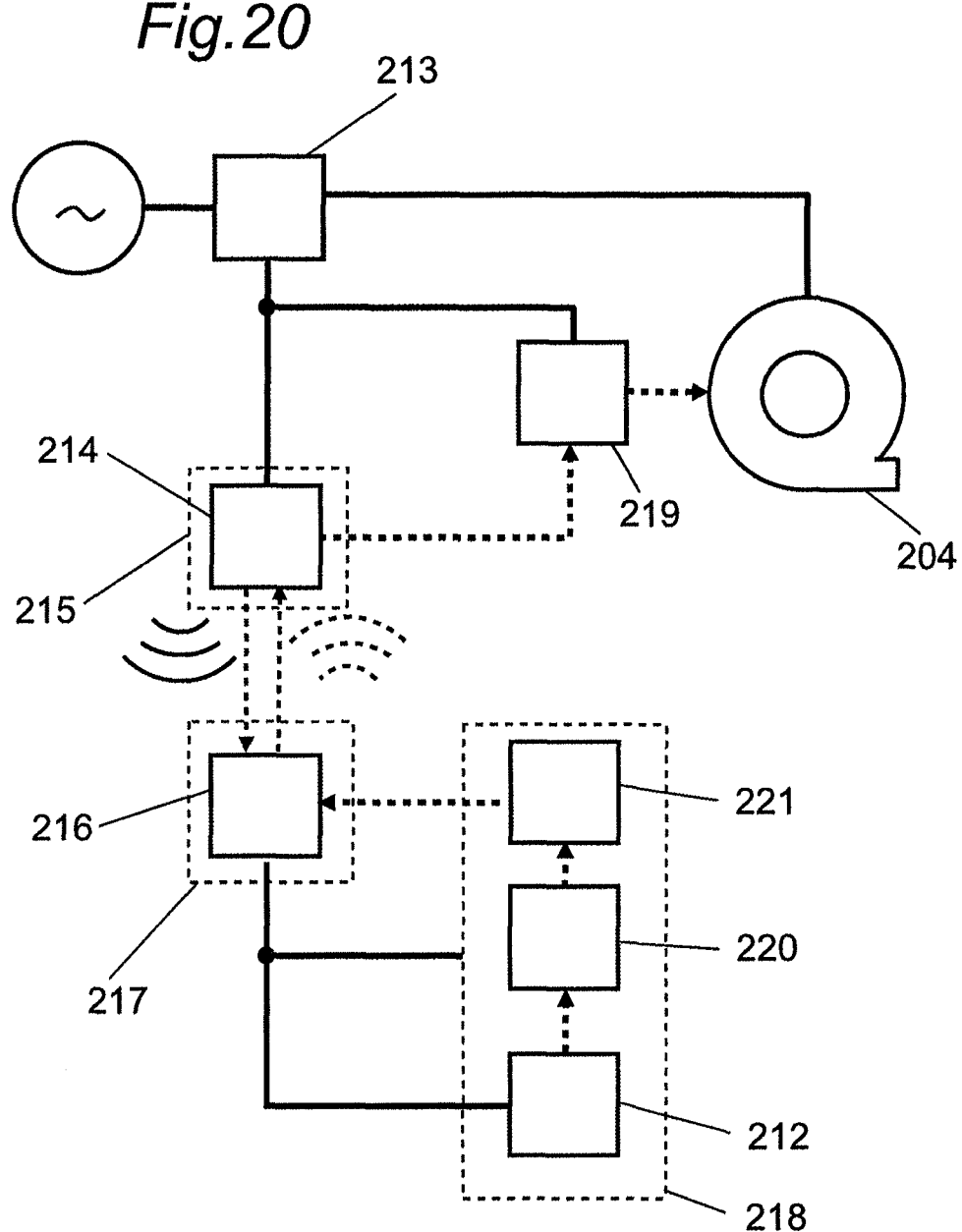
FIG. 20 is a schematic block diagram showing the configuration of the ventilation fan according to the fourth embodiment.

Also, as shown in FIG. 20, the body side contactless power transmitting and receiving unit 215 is connected to a fan controller 219 that controls the fan 204 based on the control operation signal of the fan 204 received from a decorative board side contactless power transmitting and receiving unit 217.

The decorative board 207 is provided with the decorative board side contactless power transmitting and receiving unit 217 and a controller 218 connected to the decorative board side contactless power transmitting and receiving unit 217 to work upon receipt of power supply.

The decorative board side contactless power transmitting and receiving unit 217 includes a decorative board side coil unit 216 for receiving power supply from the body side contactless power transmitting and receiving unit 215 and for transmitting the control operation signal of the fan 204 to the body side contactless power transmitting and receiving unit 215.

As shown in FIG. 21, the decorative board side coil unit 216 is annularly disposed along and in parallel to respective sides of the decorative board 207 so as to pass through locations a predetermined distance X away from the center of the decorative board 207.

That is, the decorative board side coil unit 216 is in the form of a square analogous to the shape of the decorative board 207 so as to be formed along the periphery thereof. By this configuration, as shown in FIG. 21, the body side contactless power transmitting and receiving unit 215 or the body side coil unit 214 is positioned above the decorative board side coil unit 216.

Also, it is preferred that the predetermined distance X be smaller than a distance Y from the center of the decorative board 207, at which the attachment springs 208 are positioned.

That is, the body side coil unit 214 or the body side contactless power transmitting and receiving unit 215 is positioned inwardly of the installation locations of the attachment springs 208. Because the decorative board side coil unit 216 is provided with the body side contactless power transmitting and receiving unit 215, the former is similarly positioned inwardly of the installation locations of the attachment springs 208.

As shown in FIG. 20, the controller 218 is provided with an indoor environment detecting unit 212, an operation decision portion 220 and a control operation signal-generating portion 221.

The operation decision portion 220 determines the operation of the fan 204 based on an environment detected by the indoor environment detecting unit 212.

The control operation signal-generating portion 221 outputs a control operation signal to the decorative board side contactless power transmitting and receiving unit 217 based on the operation determined by the operation decision portion 220.

The body side contactless power transmitting and receiving unit 215 has a function of transmitting electric power, for example, by magnetically resonating a resonator made up of a capacitor disposed in series with the body side coil unit 214. Similarly, the decorative board side contactless power transmitting and receiving unit 217 has a function of transmitting electric power, for example, by magnetically resonating a resonator made up of a capacitor disposed in series with the decorative board side coil unit 216.

As just described, because electric power is transmitted by magnetically resonating the resonator, if a projection plane of the body side contactless power transmitting and receiving unit 215 or the body side coil unit 214 overlaps with the decorative board side coil unit 216, transmission of electric power and transmission and reception of signals are possible.

In this fourth embodiment, the decorative board side coil unit 216 is in the form of a square analogous to the shape of the decorative board 207 so as to be formed along the periphery thereof and, accordingly, the former is disposed over a much broader range than the body side coil unit 214.

In the above-described configuration, the body side contactless power transmitting and receiving unit 215 supplies the decorative board side contactless power transmitting and receiving unit 217 with electric power to operate the controller 218.

The operation decision portion 220 in the controller 218 has an arbitrary threshold value and compares a detection signal of the indoor environment detecting unit 212 with the arbitrary threshold value to transmit an operation signal corresponding to the predetermined air volume of the fan 204. The operation signal is then sent to the control operation signal-generating portion 221.

By way of example, if the detection signal of the indoor environment detecting unit 212 is less than the threshold value, an operation signal indicating a lo-air volume (for example, 30 $m^3/h$) as the air volume of the fan 204 is transmitted, and if the detection signal of the indoor environment detecting unit 212 is greater than or equal to the threshold value, an operation signal indicating a hi-air volume (for example, 50 m³/h) is transmitted.

As described above, in the controller 218, the operation decision portion 220 determines the operation of the fan 204 (air volume to be conveyed) based on the signal detected by the indoor environment detecting unit 212, and the control operation signal-generating portion 221 generates a control operation signal corresponding to the operation determined by the operation decision portion 220.

The control operation signal generated in this way is sent to the body side contactless power transmitting and receiving unit 215 via the decorative board side contactless power transmitting and receiving unit 217 and then to the fan controller 219.

Because the fan controller 219 changes the control operation of the fan 204 based on the above-described control operation signal, the operation control of the fan 204 can be easily realized based on the indoor environment detecting unit 212.

In summary, the controller 218 of the decorative board 207 is supplied with electric power that has been received by the decorative board side contactless power transmitting and receiving unit 217 from the body side contactless power transmitting and receiving unit 215 for subsequent operation of the operation decision portion 220.

The operation decision portion 220 determines the operation of the fan 204 (air volume to be conveyed) based on the indoor environment detected by the indoor environment detecting unit 212.

The control operation signal-generating portion 221 outputs the control operation signal to the decorative board side contactless power transmitting and receiving unit 217 based on the operation of the fan 204 determined by the operation decision portion 220.

The above-described control operation signal is received by the body side contactless power transmitting and receiving unit 215 to allow the fan controller 219 to control the fan 204, thus making it possible to transmit and receive electric power and signals in a contactless manner and to dispense with lead wires between the body case 201 and the decorative board 207.

A positional relationship between the body side coil unit 214 and the decorative board side coil unit 216, which characterizes the fourth embodiment, is explained hereinafter.

The configuration has been already explained, but as shown in FIG. 21, the body side coil unit 214 is positioned at a location laterally a predetermined distance X away from the center of the body case 201. Also, the decorative board side coil unit 216 is in the form of a square analogous to the shape of the decorative board 207 at a location the predetermined distance X away from the center of the decorative board 207 so as to be formed along the periphery thereof.

By this configuration, the body side coil unit 214 is positioned at a location on one side of the decorative board side coil unit 216. Accordingly, even if the location of the decorative board side coil unit 216 is changed by changing the mounting direction of the decorative board 207, the distance between the body side coil unit 214 and the decorative board side coil unit 216 can be maintained constant. That is, the decorative board side contactless power transmitting and receiving unit 217 can transmit and receive electric power and signals to and from the body side contactless power transmitting and receiving unit 215 irrespective of the mounting direction of the decorative board 207.

Also, the decorative board side coil unit 216 or the body side contactless power transmitting and receiving unit 215 is positioned inwardly of the installation locations of the attachment springs 208.

This configuration does not allow the body side coil unit 214 and the decorative board side coil unit 216 to interfere with each other even by rotation of the decorative board 207, thus making it possible to change the mounting direction by rotation of the decorative board 207.

Also, because the indoor environment detecting unit 212 is positioned at a corner portion of the decorative board 207, the attachment springs 208 does not interfere with the mounting portions 209. Accordingly, the detection area of the indoor environment detecting unit 212 can be adjusted merely by changing the mounting direction of the decorative board 207.

As described above, the mounting direction of the decorative board 207 can be easily changed without the need of connecting the body case 201 and the decorative board 207 with lead wires.

Also, the detection area of the indoor environment detecting unit 212 can be adjusted merely by changing the mounting direction of the decorative board 207. That is, the mounting direction of the decorative board 207 can be changed in accordance with the structure of a house in which the ventilation fan is installed, and the detection area of the indoor environment detecting unit 212 can be changed to an optimal one, thus making it possible to realize a highly convenient ventilation fan.

As in the ventilation fan according to the fourth embodiment, the idea of devising the positional relationship and configurations of the body side coil unit 214 and the decorative side coil unit 216 to adjust the detection area of the indoor environment detecting unit 212 mounted on the decorative board 207 merely by changing the mounting direction of the decorative board 207 is applicable to the ventilation fan according to the first embodiment referred to above. By way of example, if a sensor module is mounted on a decorative board so as to be connected to the decorative board side coil unit, the detection area of a sensor of the sensor module can be adjusted by changing the mounting direction of the decorative board. Also, when the sensor module is replaced with another sensor module, the detection area can be adjusted to suit for a specification of a sensor mounted in the latter.

The ventilation fans according to the embodiments referred to above do away with the need to prepare many kinds of ventilation fans to cope with various indoor environments, thus resulting in a reduction in various costs. Accordingly, they are expected to be used as ventilation fans that can be mounted on a ceiling.

(Embodiment 5)

A ventilation system according to a fifth embodiment of the present invention is explained hereinafter. In the ventilation system according to this fifth embodiment, a plurality of ventilation fans are connected to one another via a communication network so that a fan control of each fan is performed with reference to fan control information of other fans.

Figure 22:
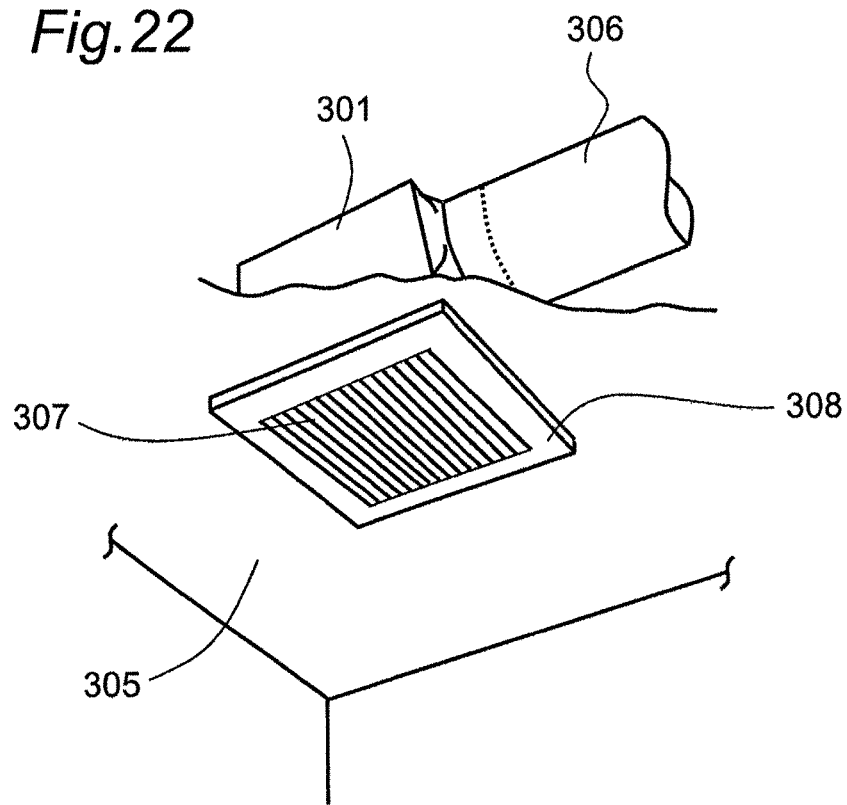
FIG. 22 is a partially cutaway perspective view of a ventilation fan mounted in a ventilation system according to a fifth embodiment of the present invention, showing an example of installation thereof.
Figure 23:
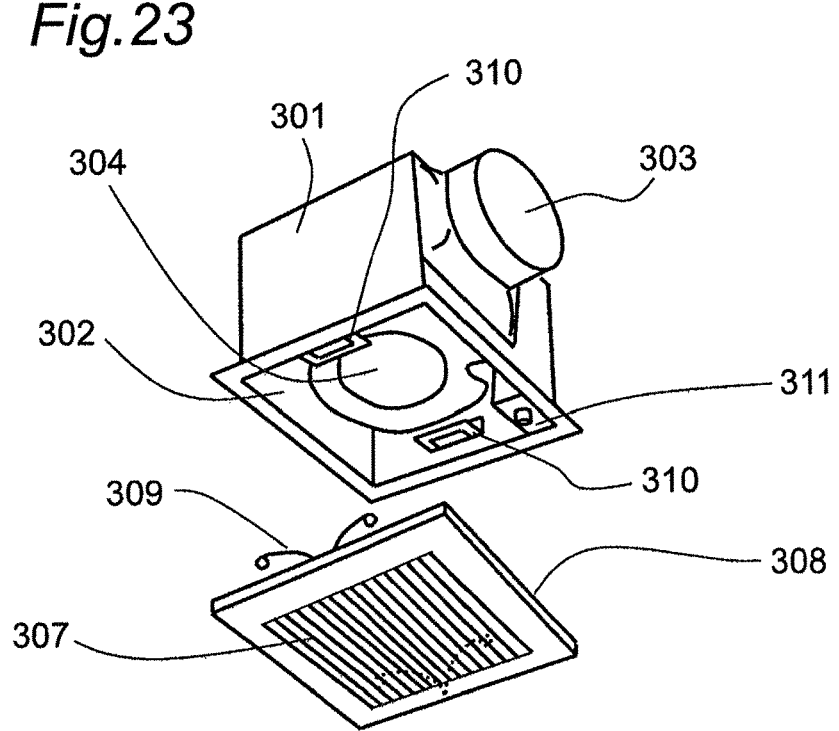
FIG. 23 is an exploded perspective view of the ventilation fan according to the fifth embodiment.

FIG. 22 and FIG. 23 depict a ventilation fan provided in the ventilation system according to this fifth embodiment. A body case 301 of the ventilation fan is a box-shaped body case having an indoor air suction opening 302 defined in a lower surface thereof and an indoor air discharge opening 303 defined in a side surface (or an upper surface) thereof. A fan 304 is accommodated within the body case 301.

As shown in FIG. 22, the body case 301 of this ventilation fan is mounted on an upper surface of a ceiling board 305, which has an opening (not shown) of a size nearly equal to that of the indoor air suction opening 302.

The indoor air discharge opening 303 in the body case 301 of the ventilation fan is connected to one end of a duct 306, the other end of which is extended to outdoors.

As shown in FIG. 22, the body case 301 is mounted on the upper surface of the ceiling board 305 and, in such a state, a decorative board 308 having slit-like ventilation holes 307 defined therein is removably mounted so as to cover the indoor air suction opening 302 from a lower surface of the ceiling board 305.

In mounting the decorative board 308 on the body case 301, a well-known structure is employed. Briefly explaining, as shown in FIG. 23, this work can be easily done by engaging attachment springs 309 of the decorative board 308 with respective mounting portions 310 of the body case 301. The decorative board 308 is formed so as to be greater than the indoor air suction opening 302 in the body case 301. Because of this, the decorative board 308 can cover an opening (not shown) in the ceiling board 305 and the indoor air suction opening 302 from the lower surface side of the ceiling board 305, thereby enhancing an aesthetic aspect.

Figure 24:
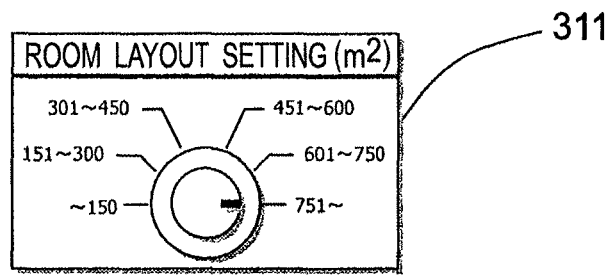
FIG. 24 is a view showing a floor area setting section provided on the ventilation fan according to the fifth embodiment ((a) being an external view and (b) being a correlation diagram between a floor area and an air volume).

Also, a floor area-setting portion 311 is mounted to the body case 301 at a location where a user can easily confirm and operate the floor area-setting portion 311, upon removal of the decorative board 308, to set a rough total floor area of a whole building (total floor area of a plurality of rooms), in which respective ventilation fans of the ventilation system are mounted. As shown in FIG. 24(a), the floor area-setting portion 311 is provided with a dial switch capable of setting a room layout (that is, the total floor area) of the building in any one of a plurality of ranges, but any other switch than the dial switch may be used if it enables selective setting.

In the construction industry, it is common to determine the air volume that should be secured depending on the floor area of a building. For this reason, as shown in FIG. 24(b), a total ventilation air volume required for the building is defined depending on the floor layout (total floor area).

Figure 25:
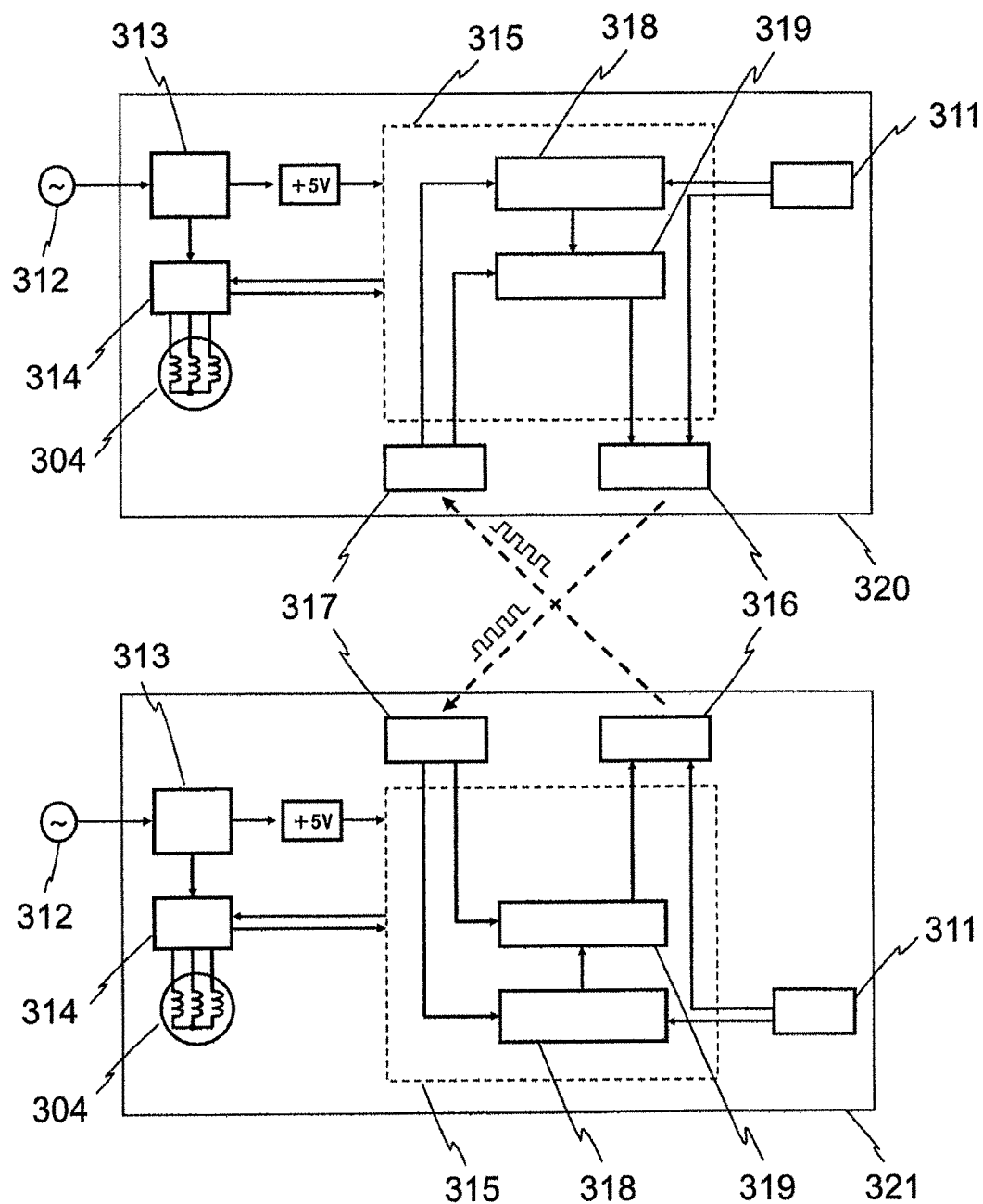
FIG. 25 is a control block diagram of the ventilation system according to the fifth embodiment.

A block diagram of a control circuit of the ventilation system is explained hereinafter with reference to FIG. 25.

Each block of the control circuit of the ventilation system includes a power circuit 313 connected to a commercially available power source 312, a fan 304 such as, for example, a DC motor having three-phase (U, V and W phases) stator windings connected to output voltage terminals of the power circuit 313 via, for example, a drive IC 314 that is an aggregate of switching elements such as FETs, a controller 315 for executing various information processing to control the speed of the fan 304, a floor area-setting portion 311 connected to the controller 315 to set floor area information of a building, an information transmitting portion 316 for transmitting information to other ventilation fans, and an information receiving portion 317 for receiving information from the other ventilation fans.

The controller 315 is driven with a DC5V or DC3V output voltage of the power circuit 313 and includes a CPU (Central Processing Unit). The operation of the controller 315 explained later is conducted in the form of a program in which a counter, a RAM and a Rom cooperate with one another within the controller 15.

Also, the controller 315 transmits and receives air volume information of the ventilation fan and floor area information of the building set by the floor area-setting portion 311 to and from the other ventilation fans via the information transmitting portion 316 and the information receiving portion 317. Even if either one of a wired connection and a wireless connection is employed for connection of the information transmitting portions 316 and the information receiving portions 317 of the respective ventilation fans, similar effects are promising.

Further, the controller 315 is provided with a total ventilation air volume decision means 318 and a first air volume decision means 319.

The total ventilation air volume decision means 318 compares the floor area information set by the floor area-setting portion 311 of a first ventilation fan 320 employed as one ventilation fan with the floor area information set by the floor area-setting portion 311 of a second ventilation fan 321 employed as another ventilation fan to recognize greater floor area information as the total floor area of the building and to set air volume information corresponding to this total floor area stored in the CPU in advance to the required total ventilation air volume.

The first air volume decision means 319 determines the air volume of the self based on the total ventilation air volume determined by the total ventilation air volume decision means 318 of the first ventilation fan 320 and the information of the second ventilation fan 321 to adjust the air volume of the fan 304.

An air volume control operation of the ventilation fan in the ventilation system of the above-described configuration is explained with reference to a flowchart shown in FIG. 26.

Figure 26:
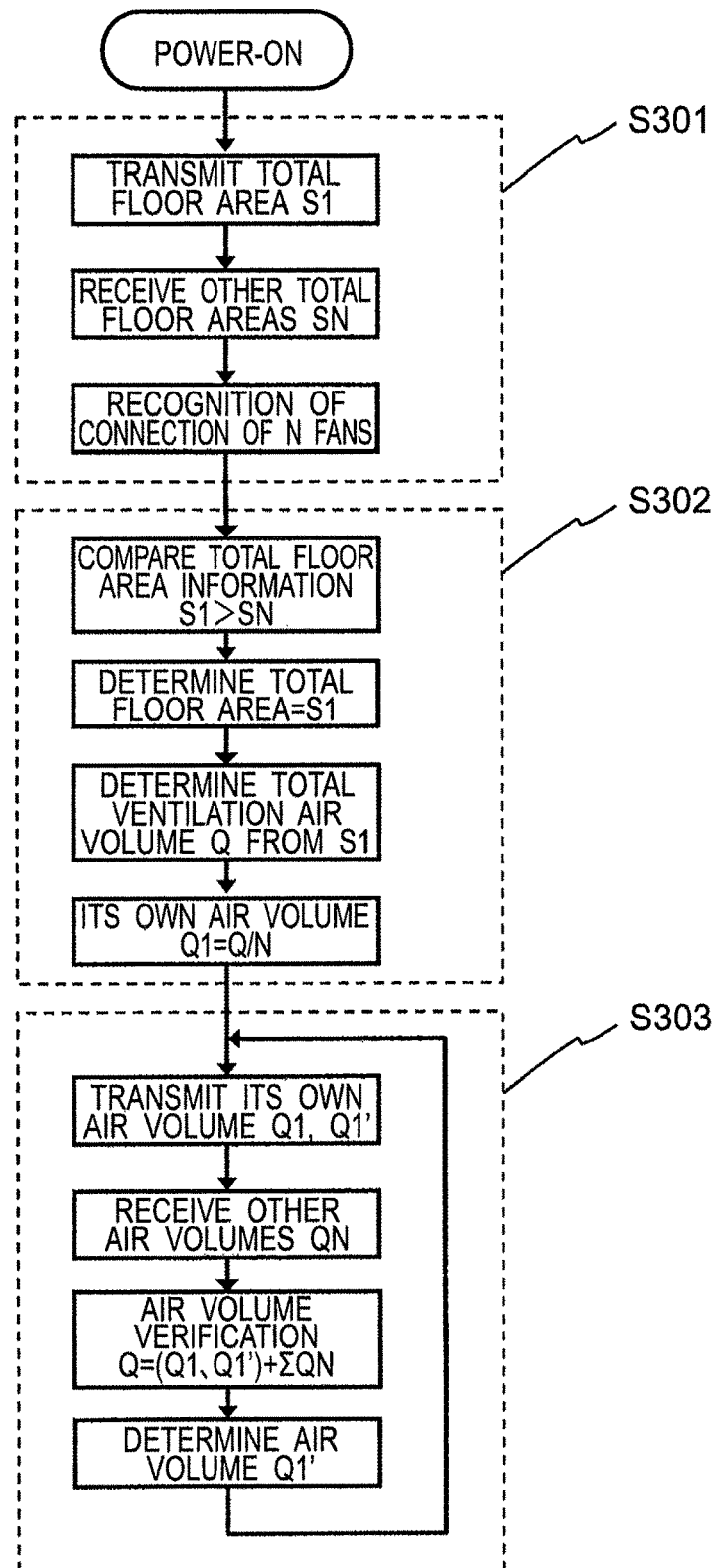
FIG. 26 is a control flowchart of the ventilation system according to the fifth embodiment.

The flowchart shown in FIG. 26 includes a flow (step S301) of obtaining the information set by the floor area-setting portion 311 of the first ventilation fan 320 and that of another fan, i.e., the second ventilation fan 321 installed in the same building, a flow (step S302) of indicating the total ventilation air volume decision means 318, and a flow (step S303) of indicating the first air volume decision means 319.

It is assumed here that the ventilation system includes two ventilation fans having the same specification including a maximum air capacity of 150 [m$^2$/h] and installed in a building having a total floor area greater than or equal to 751 m$^2$ and that the two ventilation fans are the first ventilation fan 320 and the second ventilation fan 321, respectively. This ventilation system is hereinafter explained in detail.

At step S301, when the first ventilation fan 320 and the second ventilation fan 321 are supplied with electric power, the floor area information set by the floor area-setting portions 311 of the two ventilation fans is recognized. By way of example, it is assumed that the setting value of the first ventilation fan 320 is S1=751 [m$^2$] or greater and the setting value of the second ventilation fan 321 is S2=451-600 [m$^2$]. In this case, the first ventilation fan 320 transmits the information S1 to the second ventilation fan 321 and the second ventilation fan 321 transmits the information S2 to the first ventilation fan 320, thereby completing a two-way communication and making it possible to recognize each other's floor area information and that two ventilation fans are connected to each other within the same building.

At subsequent step S302, the operation of the total ventilation air volume decision means 318 is explained. The total ventilation air volume decision means 318 compares the information S1 and the information S2 with each other and recognizes a greater value, i.e., the information of S1=751 [m$^2$] or greater here as the total floor area information of the building. The controller 315 stores table data of FIG. 24(b) therein and converts such information into a total ventilation air volume of Q=250 [m$^3$/h] required for the building corresponding to S1=751 [m$^2$] or greater to recognize the latter.

At subsequent step S303, the operation of the first air volume decision means 319 is explained.

Because the maximum air capacity of the first ventilation fan 320 and that of the second ventilation fan 321 are both 150 [m³/h], when the two ventilation fans are operated at the maximum capacity at the same time, the total ventilation air volume becomes equal to 150×2=300 [m³/h], thus resulting in an air volume excess state by 50 [m³/h] with respect to the required total ventilation air volume of Q=250 [m³/h].

Accordingly, based on the information recognized at step S301 and indicating that the two ventilation fans are connected within the same building and on the information recognized at step S302 and indicating that the total ventilation air volume required for the building is Q=250 [m³/h], the air volume required for each ventilation fan is determined as being Q1=Q/N=250/2=125 [m³/h].

A general practice is such that the indoor air discharge opening 303 in the body case 301 of the ventilation fan is connected to one end of the duct 306, the other end of which is extended outdoors and, hence, the pressure loss increases or decreases and the initially determined air volume cannot be secured in some circumstances.

There are not any problems if both the ventilation fans can show the capacity of 125 [m³/h], for example, when the length of the duct 306 of the first ventilation fan 320 is nearly equal to that of the duct 306 of the second ventilation fan 321.

However, if the duct 306 of the second ventilation fan 321 is installed, for example, at a length over a designed allowable length, the second ventilation fan 321 can sometimes show only an air capacity of QN=110 [m³/h].

In such a case, the air volume may be detected using a sensor (not shown) mounted in the duct 306 or based on information of an electric current or speed of the fan 304.

The air volume of the first ventilation fan 320 is subsequently adjusted again to an air volume of Q1'=250-110=140 [m³/h] so as to ensure the total ventilation air volume of Q=250 [m³/h] required for the building, thereby making it possible to determine the air volumes of both the ventilation fans to hold the ventilation air volume of the building constant.

Although the ventilation system according to this fifth embodiment has been explained as having two ventilation fans, similar effects can be obtained even if the number of the ventilation fans increases.

As described above, in this fifth embodiment, all the ventilation fans of the ventilation system obtain mutual information so that the ventilation fans may be operated by determining the ventilation air volume of each ventilation fan based on the information obtained by the total ventilation air volume decision means 318 and the information about the air volumes and the number of the ventilation fans installed in the same building. By doing so, even in an environment where the total ventilation capacity of the respective ventilation fans is excessive for the total ventilation air volume required for the whole building, the ventilation fans can be controlled to reduce the respective air volumes without any subordinate-superior relationship among the ventilation fans, thereby making it possible to optimally maintain the air volume required for the whole building.

(Embodiment 6)

A configuration of a ventilation system according to a sixth embodiment of the present invention is explained with reference to FIG. 27 to FIG. 29.

The same component parts as those of the ventilation system according to the fifth embodiment referred to above are designated by the same signs and explanation thereof is omitted.

Figure 27:
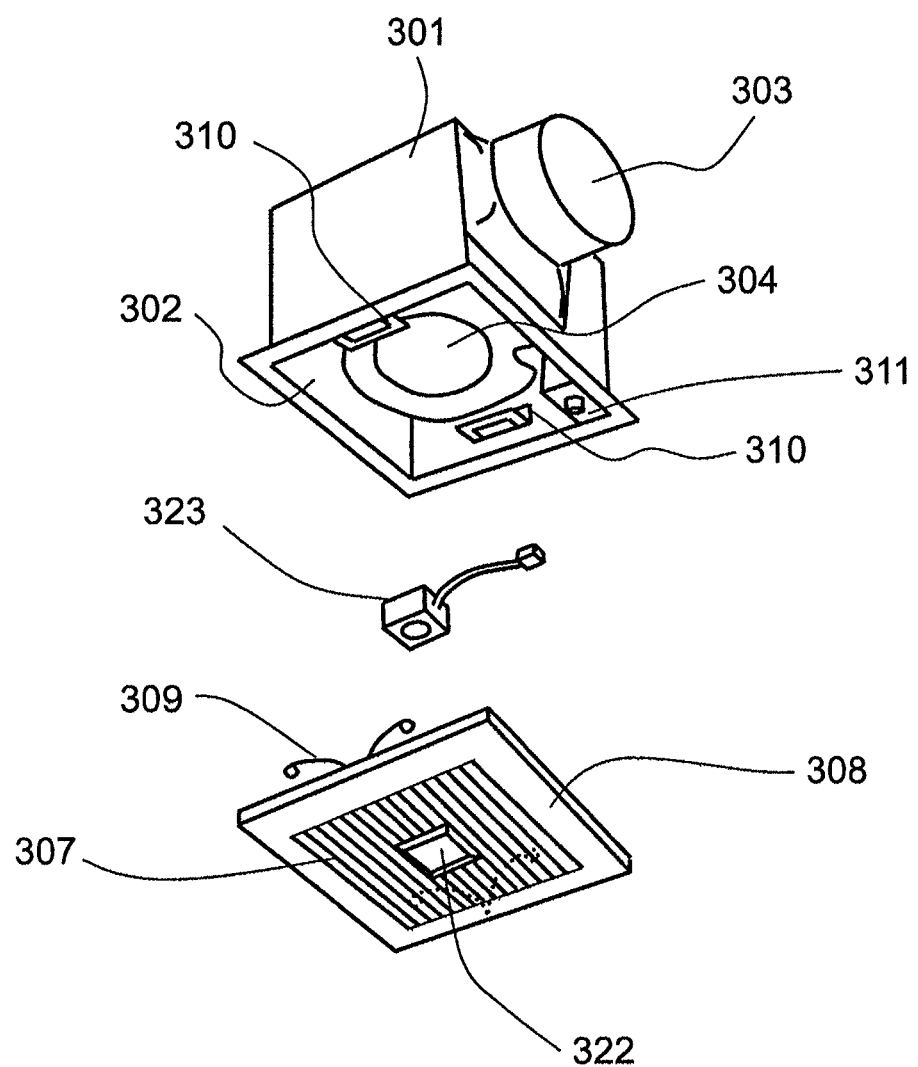
FIG. 27 is an exploded perspective view of a ventilation fan mounted in a ventilation system according to a sixth embodiment of the present invention.

As shown in FIG. 27, a decorative board 308 has ventilation holes 307 and an environment detecting unit-mounting hole 322 all defined therein, and an environment detecting unit 323 is mounted in the environment detecting unit-mounting hole 322. The environment detecting unit 323 (that is, an indoor environment detecting sensor) is made up of at least one of a human body detecting sensor, a temperature sensor, a humidity sensor, a carbon monoxide sensor and a carbon dioxide sensor.

Figure 28:
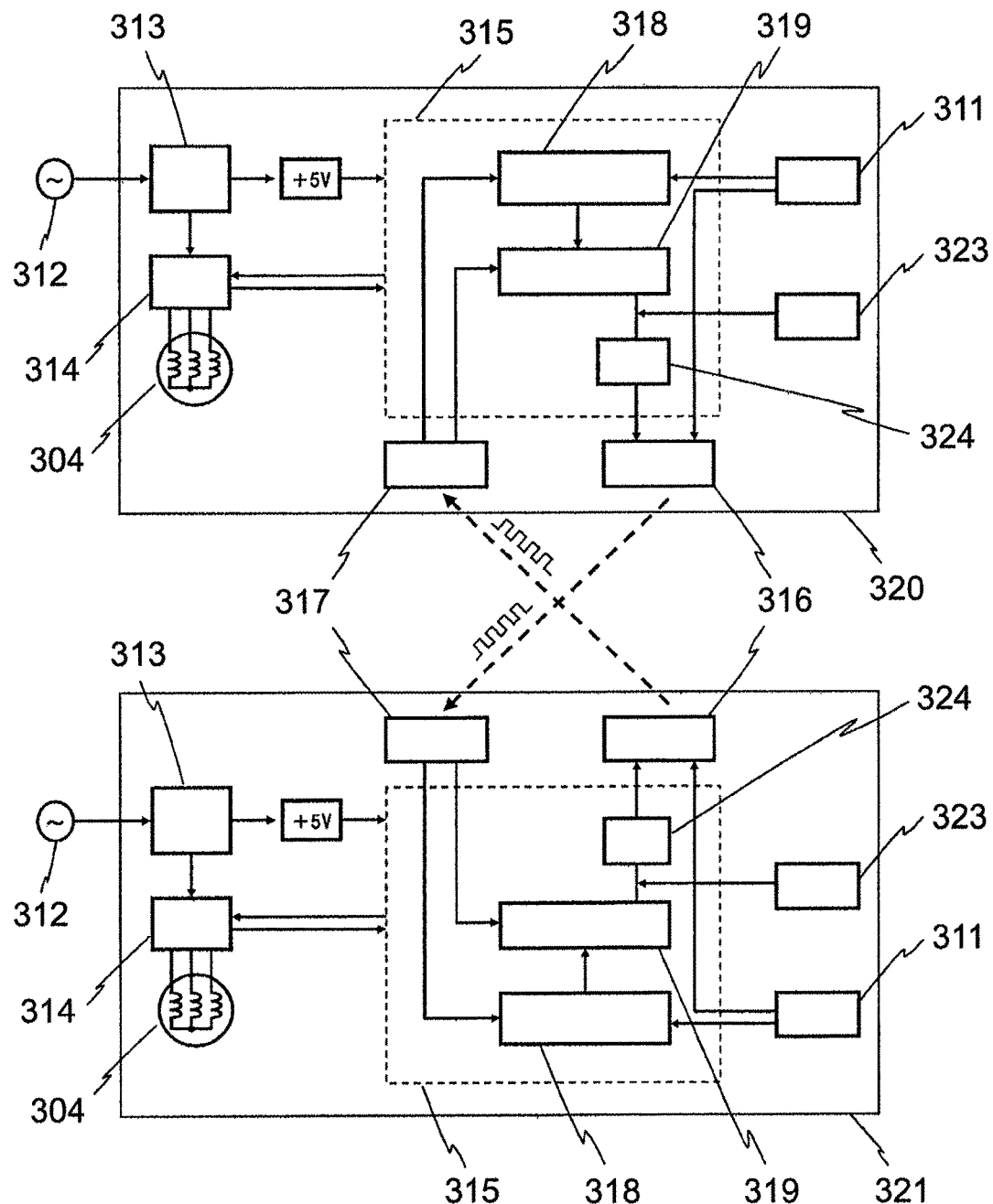
FIG. 28 is a control block diagram of the ventilation system according to the sixth embodiment.
Figure 29:
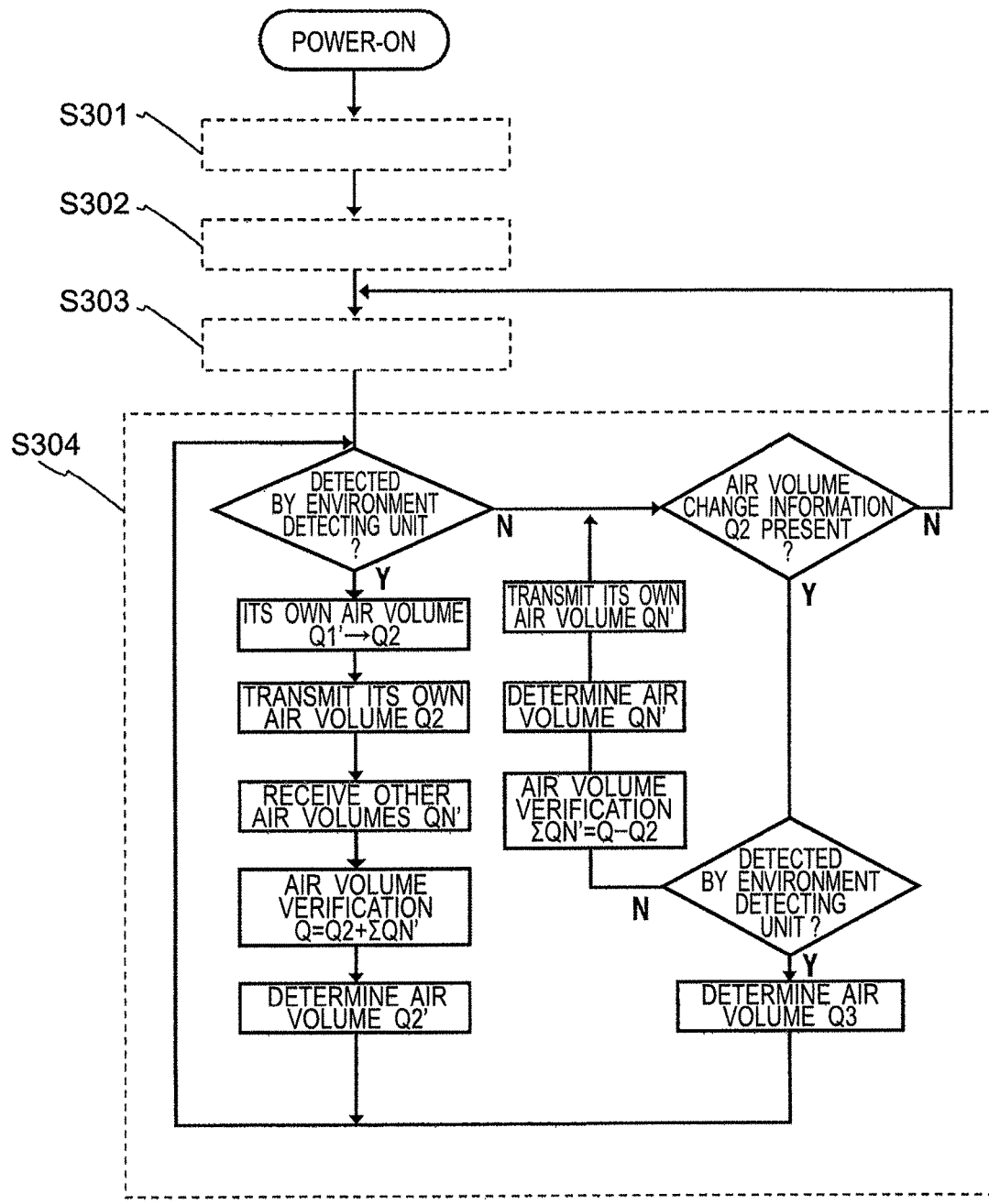
FIG. 29 is a control flowchart of the ventilation system according to the sixth embodiment.

As shown in a block diagram of a control circuit of the ventilation system of FIG. 28, the environment detecting unit 323 is connected to a controller 315, which recognizes changes of various sensor signals of the environment detecting unit 323.

The controller 315 includes a second air volume decision means 324 provided therein in the form of a program to determine a new air volume thereof based on total air volume information determined by a total ventilation air volume decision means 318 and the information of the various environmental changes detected by the above-described environment detecting unit 323 to thereby adjust the air volume of a fan 304.

An example in which various sensors of the environment detecting unit 323 include, for example, a human body detecting sensor 325 for detecting the presence or absence of a human body is explained hereinafter.

In this configuration, an air volume control operation of the ventilation system according to the sixth embodiment is explained with reference to a flowchart shown in FIG. 29.

At step S304, the operation of the second air volume decision means 324 is explained.

It is assumed that in an environment where a total ventilation air volume of Q=250 [m³/h] is required for a building, the first ventilation fan 320 and the second ventilation fan 321 are being operated at an air volume of Q1'=125 [m³/h] determined by the first air volume decision means 319.

If the human body detecting sensor 325 in the environment detecting unit 323 of the first ventilation fan 320 detects a human body, the controller 315 recognizes a detection signal.

In order to forcibly discharge dirty air outside, the controller 315 controls the speed of the fan 304 to change the air volume to Q2=150 [m³/h], i.e., a maximum air capacity of the first ventilation fan 320. Because the air volume of the second ventilation fan 321 is still Q1'=125 [m³/h], the total ventilation air volume becomes equal to 150+125=275 [m³/h], thus resulting in an air volume excess state by 25 [m³/h] with respect to the total ventilation air volume of Q=250 [m³/h] required for the building.

Because of this, the first ventilation 320 transmits its own changed air volume of Q2=150 [m³/h] to the second ventilation fan 321, which in turn confirms the detection signal of the environment detecting unit 323. If the detection signal indicates a non-detection state, the second ventilation fan 321 calculates its own air volume QN' based on the new air volume Q2 of the first ventilation fan 320. Based on the total ventilation air volume of Q=250 [m³/h] required for the building, the present air volume of Q2=150 [m³/h] of the first ventilation fan 320, and information about the number N of ventilation fans connected together in the building, the air volume QN' is calculated as follows:

$QN'=(Q-Q2)/(N-2)=(250-150)/(2-1)=100$ [m³/h].

The second ventilation fan 321 changes its own air volume to QN'=100 [m³/h] and transmits a change completion signal QN' to the first ventilation fan 320. The first ventilation fan 320 confirms that a sum of the air volume information of QN'=100 [m³/h] transmitted from the second ventilation fan 321 and its own air volume of Q2=150 [m³/h] is equal to the total air volume of Q=250 [m³/h] required for the building and finally determines the air volume of the first ventilation fan 320 as being Q2'=150 [m³/h]. If a person exits a room and the human body detecting sensor 325 detects no person, the program returns to step S303, at which the respective ventilation fans are operated at an air volume of Q1'=125 [m³/h].

If the human body detecting sensors 325 of both the first ventilation fan 320 and the second ventilation fan 321 detect a person, dirty air in each space is forcibly discharged outside. For this reason, the respective ventilation fans are operated at Q2'=Q3=150 [m³/h] to preferentially ensure the required ventilation air volumes and, accordingly, a ventilation air volume excess state continues for a given period of time, but when the human body detecting sensors 325 detect no person and after dirty air has been discharged, the program returns to step S303, at which the respective air volumes are changed to Q1'=125 [m³/h], thus resulting in a state where the original total air volume of Q=250 [m³/h] is maintained.

Although the ventilation system according to the sixth embodiment has been described as having, for example, two ventilation fans, similar effects can be obtained even if the number of the ventilation fans increases.

As described above, in the ventilation system according to the sixth embodiment, all the ventilation fans of the ventilation system obtain mutual information so that the ventilation fans may be operated by determining the air volume of each ventilation fan based on the information obtained by the total ventilation air volume decision means 318 and the information about the air volumes and the number of the ventilation fans installed in the same building. By doing so, even if the ventilation fans having respective sensors must increase the air volume for a given period of time in tandem with sensor signals, the ventilation fans can be controlled to increase or decrease the respective air volumes without any subordinate-superior relationship among the ventilation fans, thereby making it possible to optimally maintain the air volume required for the whole building.

As in the ventilation system according to the sixth embodiment, the idea of controlling the air volume of each ventilation fan by obtaining the mutual air volume information among a plurality of ventilation fans to obtain the total ventilation air volume required for the whole ventilation system is applicable to the ventilation fan according to the first embodiment referred to above.

Figure 30:
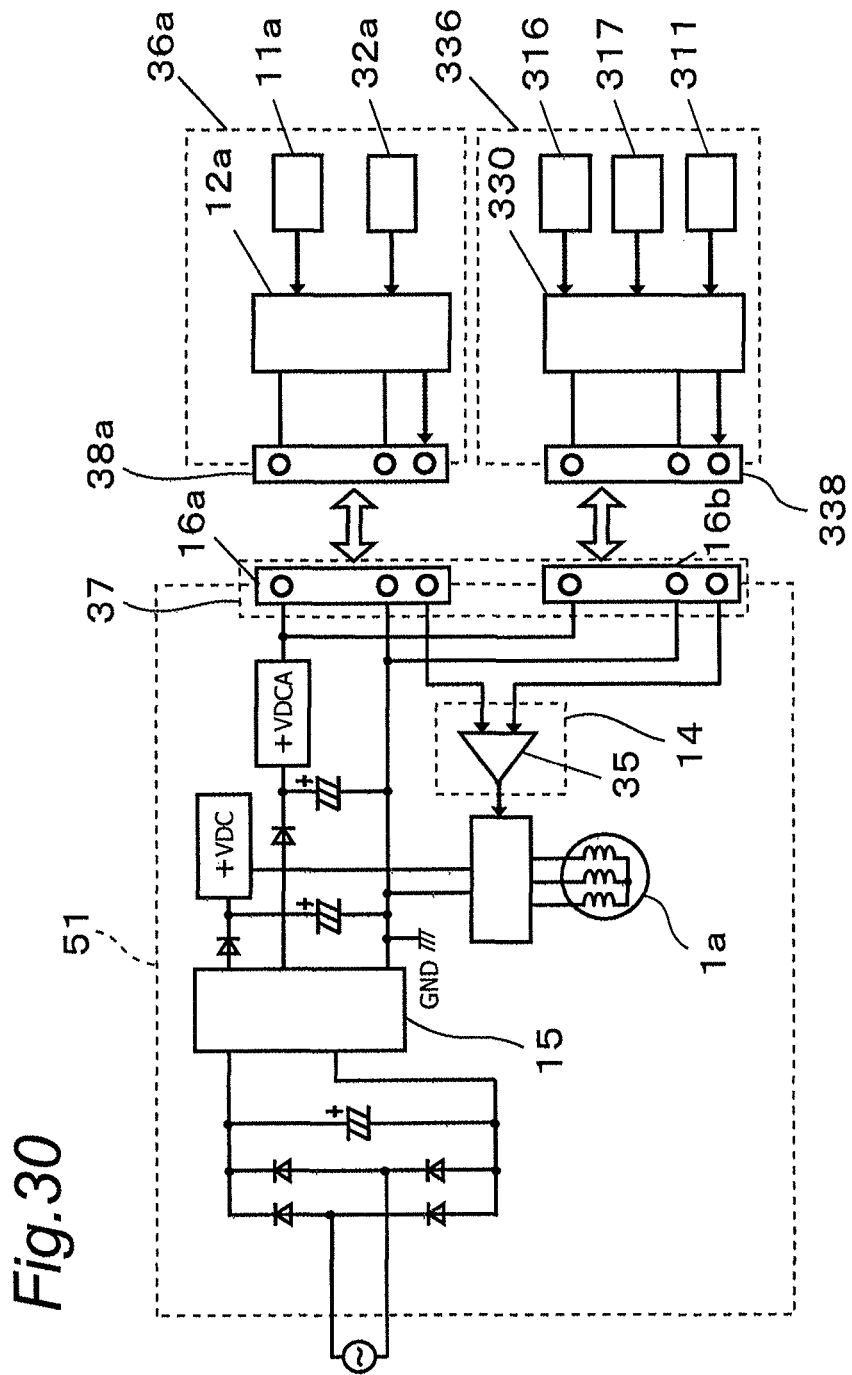
FIG. 30 is a control block diagram of a ventilation system according to a modified form of the sixth embodiment.

By way of example, as shown in a block diagram indicating a control configuration of a plurality of ventilation fans of a ventilation system of FIG. 30, a communication module 336 may be replaceably mounted on a body unit 51 of each ventilation fan to allow transmission and reception of the air volume information among the plurality of ventilation fans.

If such a communication module 336 is configured as a common module with, for example, the sensor module 36 and if one of the ventilation fans requires the communication module 336, the sensor module 36 can be replaced with the communication module 336. The communication module 336 is provided with a floor area-setting portion 311, an information transmitting portion 316, an information receiving portion 317, a module controller 330 for controlling these components, and a connector 338 to be connected to a connector 16b of a module mount 37.

A combination of the sensor module 36 having an indoor environment detecting sensor required for an indoor environment and the communication module 336 may be mounted on the body unit 51 to make it possible to obtain the effects produced by the ventilation system according to the sixth embodiment.

As described above, according to the fifth or sixth embodiment, because the ventilation fans create a network to provide an optimum air volume required for a building, the ventilation fans can be used in offices, shops and the like as well as in homes.

Any combination of the various embodiments referred to above can produce respective effects.

Although the present invention has been fully described by way of preferred embodiments with reference to the accompanying drawings, it is to be noted here that various changes and modifications will be apparent to those skilled in the art. Therefore, unless such changes and modifications otherwise depart from the scope of the present invention as set forth in the appended claims, they should be construed as being included therein.

The invention claimed is:

1. A ventilation fan comprising:
   a body unit including:
      a body case having an indoor air suction opening and an indoor air discharge opening both defined therein, the body case configured to be located on or above a ceiling board;
      a fan disposed in the body case; and
      a fan controller operable to control an air volume of the fan;
   a decorative board which is removably mounted on the body unit so as to cover the indoor air suction opening from a lower surface of the ceiling board;
   a sensor module including;
      an indoor environment detecting sensor; and
      a module controller operable to control a detecting operation of the indoor environment detecting sensor;
   wherein the body unit has a module mount on which the sensor module is mounted and another sensor module can be mounted in place of the sensor module, the module mount comprising one or more electrical connectors for electrically connecting with the sensor module, and the module mount being electrically connected to the fan controller, and
   the decorative board has a ventilation hole and a mounting portion, the ventilation hole is a hole for communicating the indoor air suction opening in the body case with an indoor space to allow indoor air to be introduced into the body case by passing through the decorative board and the indoor air suction opening, the module mount and the sensor module mounted on the module mount being removably mounted to the mounting portion, and
   the module controller outputs detection information obtained based on a detection result of the indoor environment detecting sensor to the fan controller, which controls the air volume of the fan based on the detection information inputted thereto.

2. The ventilation fan according to claim 1, wherein the module controller outputs identification information of the indoor environment detecting sensor to the fan controller, which controls the air volume of the fan based on the identification information and the detection information inputted thereto.

3. The ventilation fan according to claim 1, wherein a plurality of sensor modules can be simultaneously mounted on the module mount and the fan controller has an arithmetic section to calculate the air volume of the fan based on different detection information inputted from the plurality of sensor modules using an algorism set in advance.

4. The ventilation fan according to claim 1, wherein the module controller determines air volume information of the fan based on a kind or the detection result of the indoor environment detecting sensor and outputs the air volume information determined as the detection information to the fan controller.

5. The ventilation fan according to claim 1, wherein a connecting portion of the sensor module to be connected to the module mount has a common shape with a connecting portion of another sensor module.

6. The ventilation fan according to claim 1, wherein the sensor module comprises at least one of a human body detecting sensor, a temperature sensor, a humidity sensor, an illumination sensor, a carbon monoxide sensor and a carbon dioxide sensor as the indoor environment detecting sensor.

7. A ventilation system operable to hold a ventilation air volume constant in a building, comprising:
at least two ventilation fans according to claim 1 installed in the same building; and
each ventilation fan comprising;
an information transmitting portion operable to transmit its own air volume information determined based on detection information inputted from a sensor module mounted thereon to other ventilation fans;
an information receiving portion operable to receive information from the other ventilation fans; and
an air volume decision means operable to compare a total air volume of the air volume information of its own fan and the air volume information of the other ventilation fans received by the information receiving portion with a total ventilation air volume information in the building set in advance to determine the air volume of its own fan so as to maintain the total ventilation air volume.

8. The ventilation system according to claim 7, wherein each ventilation fan comprises a communication module having the information transmitting portion and the information receiving portion and is mounted on the module mount.

9. A ventilation system comprising:
a body unit for a ventilation fan, the body unit including;
a body case having an indoor air suction opening and an indoor air discharge opening both defined therein, the body case configured to be located on or above a ceiling board;
a fan disposed in the body case; and
a fan controller operable to control an air volume of the fan;
first and second decorative boards, each of which is configured to be removably mounted on the body unit so as to cover the indoor air suction opening from a lower surface of the ceiling board;
a sensor module including;
an indoor environment detecting sensor; and
a module controller operable to control a detecting operation of the indoor environment detecting sensor;
wherein the body unit has a module mount on which the sensor module is mounted and another sensor module can be mounted in place of the sensor module, the module mount comprising one or more electrical connectors for electrically connecting with the sensor module, and the module mount being electrically connected to the fan controller, and
the first and second decorative board each have a ventilation hole and a mounting portion, the ventilation hole being a hole for communicating the indoor air suction opening in the body case with an indoor space to allow indoor air to be introduced into the body case by passing through the decorative board and the indoor air suction opening, the module mount and the sensor module mounted on the module mount configured to be removably mounted to the mounting portion,
the module controller outputs detection information obtained based on a detection result of the indoor environment detecting sensor to the fan controller, which controls the air volume of the fan based on the detection information inputted thereto,
the mounting portion of the second decorative board having a different shape from the mounting portion of the first decorative board and in which another sensor module is configured to be mounted, and
the first decorative board is replaceable with the second decorative board.

* * * * *